United States Patent
Peace et al.

(10) Patent No.: US 12,417,071 B2
(45) Date of Patent: Sep. 16, 2025

(54) TECHNIQUES FOR INTELLIGENT HOME THEATER CONFIGURATION

(71) Applicant: Sonos, Inc., Santa Barbara, CA (US)

(72) Inventors: Paul Peace, Boston, MA (US); Richard Jackson, Boston, MA (US)

(73) Assignee: Sonos, Inc., Goleta, CA (US)

( * ) Notice: Subject to any disclaimer, the term of this patent is extended or adjusted under 35 U.S.C. 154(b) by 79 days.

(21) Appl. No.: 18/475,035

(22) Filed: Sep. 26, 2023

(65) Prior Publication Data

US 2024/0111484 A1    Apr. 4, 2024

Related U.S. Application Data

(60) Provisional application No. 63/412,004, filed on Sep. 30, 2022.

(51) Int. Cl.

| | |
|---|---|
| *G06F 3/04847* | (2022.01) |
| *G06F 3/0482* | (2013.01) |
| *G06F 3/16* | (2006.01) |
| *H04S 7/00* | (2006.01) |

(52) U.S. Cl.
CPC ............ *G06F 3/165* (2013.01); *G06F 3/0482* (2013.01); *G06F 3/04847* (2013.01); *H04S 7/301* (2013.01); *H04S 7/40* (2013.01); *H04S 2400/11* (2013.01); *H04S 2400/15* (2013.01)

(58) Field of Classification Search
None
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| (Continued) | | |

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Tuan S Nguyen

(57) ABSTRACT

An example computing device is configured to: display an interface that enables configuration of an audio subsystem within a local media playback system and includes one or more configuration options for the audio subsystem based on available playback devices of the local media playback system; receive a first input indicating a selection of a given configuration that comprises a given number of component playback devices each having a respective playback role; determine a set of playback devices that are available for selection as the component playback devices; display a respective visual representation for each component playback device; receive a respective input selecting a given playback device for each component playback device; configure the audio subsystem in accordance with the given configuration based on the selected playback devices; and cause the playback devices in the audio subsystem to play back audio content in synchrony based on their respective playback roles.

20 Claims, 19 Drawing Sheets

(56) References Cited

U.S. PATENT DOCUMENTS

| | | | |
|---|---|---|---|
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1* | 8/2009 | Lambourne ............ G06F 3/165 700/94 |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2* | 7/2011 | Bryce ..................... H04R 3/12 709/248 |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,303,422 | B1* | 5/2019 | Woo ................. H04N 21/43615 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1* | 6/2007 | Goldberg ............ G10H 1/0025 700/94 |
| 2021/0068173 | A1* | 3/2021 | Yore ...................... H04W 4/80 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

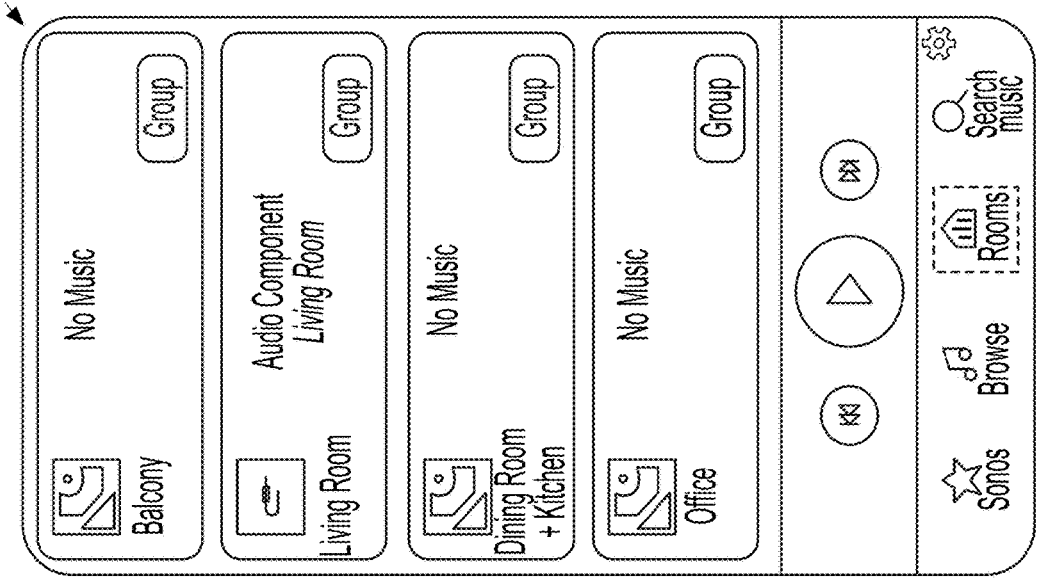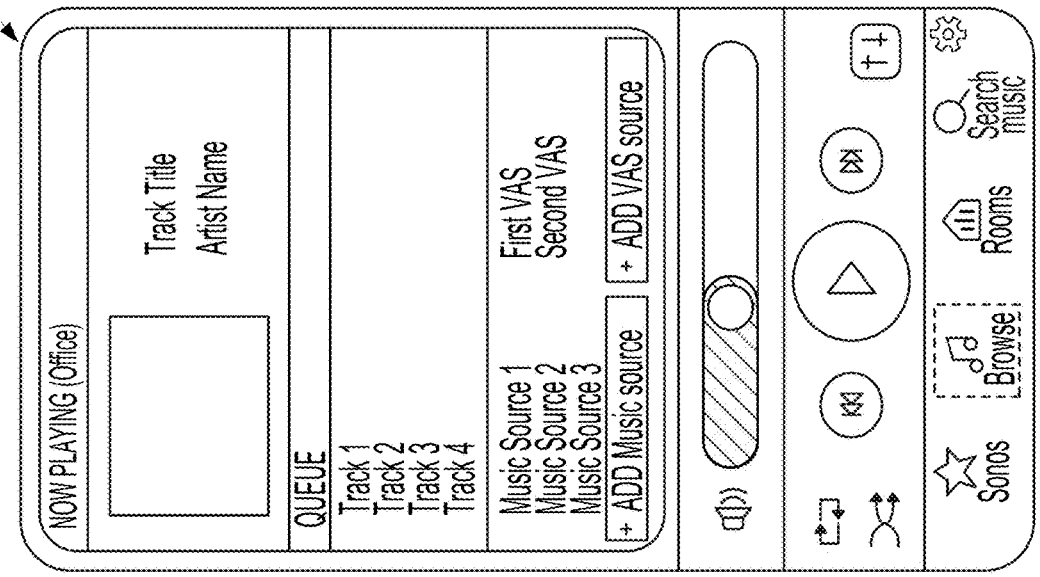
FIG. 11

TECHNIQUES FOR INTELLIGENT HOME THEATER CONFIGURATION

CROSS-REFERENCE TO RELATED APPLICATIONS

This application claims priority under 35 U.S.C. § 119 to U.S. Provisional Application No. 63/412,004 filed on Sep. 30, 2022, and titled "Techniques for Intelligent Home Theater Configuration," the contents of which are herein incorporated by reference in their entirety.

FIELD OF THE DISCLOSURE

This disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, titled "Method for Synchronizing Audio Playback between Multiple Networked Devices," and began offering its first media playback systems for sale in 2005. The Sonos Wireless Home Sound System enables users to create a local listening environment (e.g., home environment) and experience music from many sources via one or more networked playback devices.

Through a software application installed on a controller (e.g., smartphone, tablet, computer, voice input device, etc.), users can create listening experiences in any environment having a networked playback device. For instance, media content (e.g., music tracks, podcasts, audiobooks, sound accompanying video content, etc.) can be streamed to playback devices in different areas such that the playback devices can respectively play back different media content. Further, playback devices in different areas can be grouped together for synchronous playback of same media content, and/or the same media content can be heard in all rooms synchronously.

Given the ever-growing interest in digital media experiences, and particularly in experiencing digital media in home environments, there continues to be a need to develop consumer-accessible technologies that further enhance listening experiences and curate personalized experiences.

BRIEF DESCRIPTION OF THE DRAWINGS

FIG. 1I is a schematic diagram of example user interfaces of an example control device.

DETAILED DESCRIPTION

I. Overview

Figure 1A:
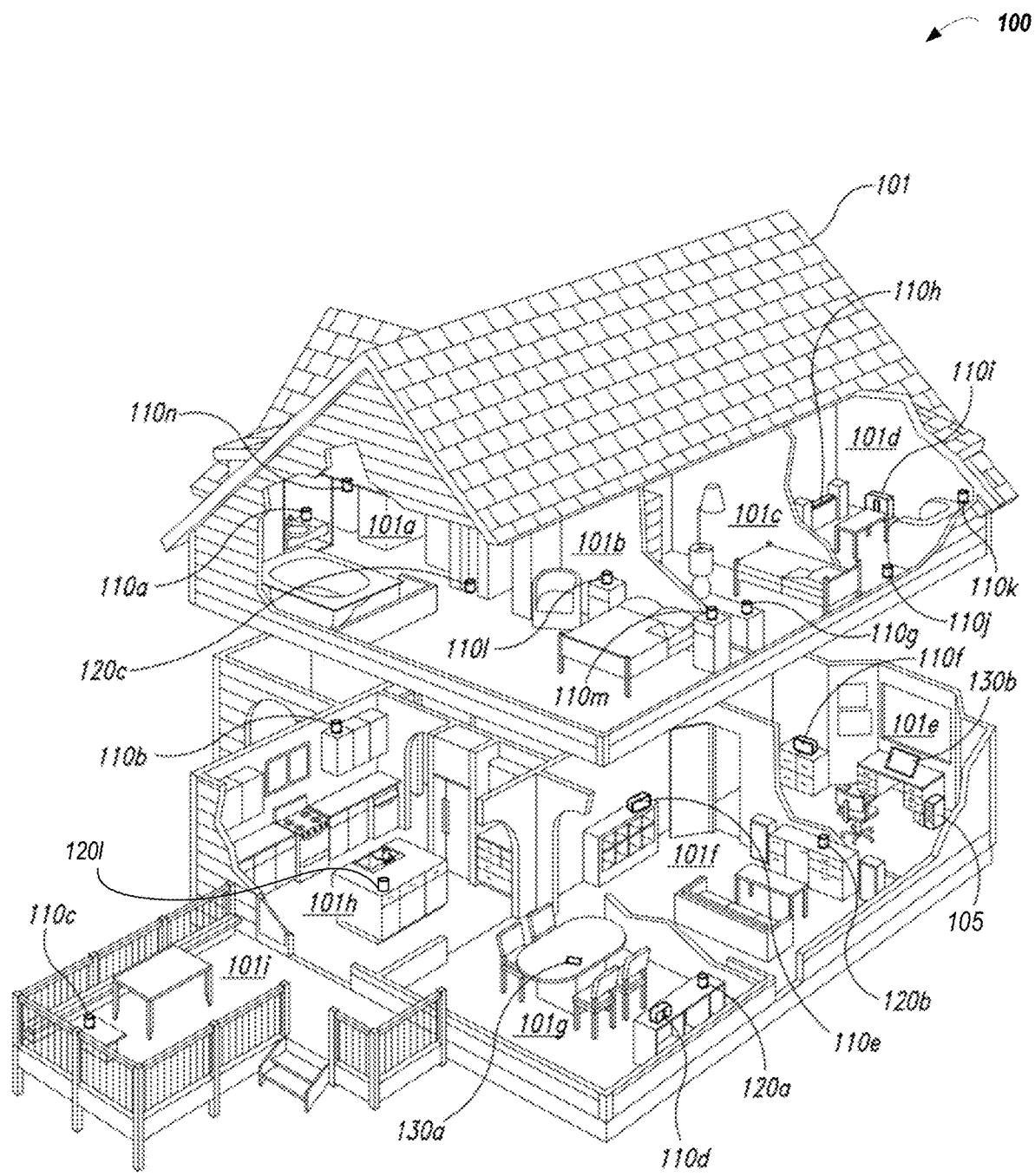
FIG. 1A is a partial cutaway view of an environment having a media playback system configured in accordance with aspects of the disclosed technology.

As mentioned above, demand continues to increase for consumer-accessible technologies that provide enhanced listening experiences. One type of listening experience includes a home theater listening experience, in which multiple playback devices arranged at particular locations within a given listening environment cooperate to play back designated audio channels of given audio content to create a surround sound effect. A home theater system generally also includes software technology implemented on a control device that enables a user to set up and interact with a home theater system.

In the context of a networked media playback system consisting of wireless playback devices as discussed herein, current software options for setting up and interacting with a home theater system may be relatively limited when compared to the continuing advancements in playback device capability (e.g., audio output capability, wireless communication capability, processing power, portability, etc.). For example, many current approaches include software technology that defines a default home theater system configuration, including a prescribed number of speakers, and walks a user through a prescribed setup process for the home theater system with little or no possibility of variation.

However, based on the number and respective capabilities of the playback devices within a user's media playback system, multiple different home theater configurations may be technically possible. The different configurations might involve more or fewer playback devices than the default configuration, including various different combinations for the arrangement of the user's playback devices at different locations within the user's listening environment for a given configuration. Nonetheless, current software approaches might not make clear the extent of the various home theater configurations that might be available to the user within their media playback system, nor provide the flexibility to implement a given configuration that should be possible, given the capability of the playback devices involved.

To address these and other shortcomings with existing approaches for implementing home theater device configurations, disclosed herein is new software technology that includes new techniques for intelligently configuring home theater systems. In particular, the techniques discussed herein may involve one or more computing devices and/or playback devices within a media playback system determining a set of one or more home theater configurations that are possible based on the playback devices that are available within the media playback system. A user may then select a desired configuration, and then further select which playback devices to assign to each given role in the selected home theater configuration. The techniques may additionally involve the identification and inclusion of portable (e.g., battery-powered) playback devices as temporary members of a home theater system. Still further, the techniques disclosed herein may provide for the dynamic adjustment of an audio image (e.g., width, height) or sound field for a given home theater system.

Accordingly, in one aspect, disclosed herein is a computing device including a user interface, at least one processor, a non-transitory computer-readable medium, and program instructions stored on the non-transitory computer-readable medium that are executable by the at least one processor such that the computing device is configured to: (i) display, via the user interface, a first set of one or more interface views that enable configuration of an audio subsystem within a local media playback system, wherein the user interface includes a set of one or more configuration options for the audio subsystem that have been determined based on available playback devices of the local media playback system; (ii) receive, via the user interface, a first input indicating a selection of a given configuration for the audio subsystem that comprises a given number of component playback devices, wherein each component playback device has a respective playback role; (iii) based on the given configuration and the available playback devices of the local media playback system, determine a set of one or more playback devices that are available for selection as the component playback devices of the given configuration for the audio subsystem; (iv) display, via the user interface, a respective visual representation for each component playback device in the given configuration for the audio subsystem; (v) receive, via the user interface, a respective input selecting a given playback device of the one or more playback devices as one of the component playback devices of the given configuration for the audio subsystem; (vi) configure the audio subsystem in accordance with the given configuration based on the selected playback devices; and (vii) cause the playback devices in the audio subsystem to play back audio content in synchrony based on their respective playback roles.

In another aspect, disclosed herein is a non-transitory computer-readable medium that is provisioned with program instructions that, when executed by at least one processor, cause a computing device to carry out the functions disclosed herein, including but not limited to the aforementioned functions carried out by the aforementioned computing device.

In yet another aspect, disclosed herein is a method carried out by a computing device that involves functions including but not limited to the aforementioned functions carried out by the aforementioned computing device.

It will be understood by one of ordinary skill in the art that this disclosure includes numerous other embodiments. It will be understood by one of ordinary skill in the art that this disclosure includes numerous other examples. While some examples described herein may refer to functions performed by given actors such as "users" and/or other entities, it should be understood that this description is for purposes of explanation only. The claims should not be interpreted to require action by any such example actor unless explicitly required by the language of the claims themselves.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
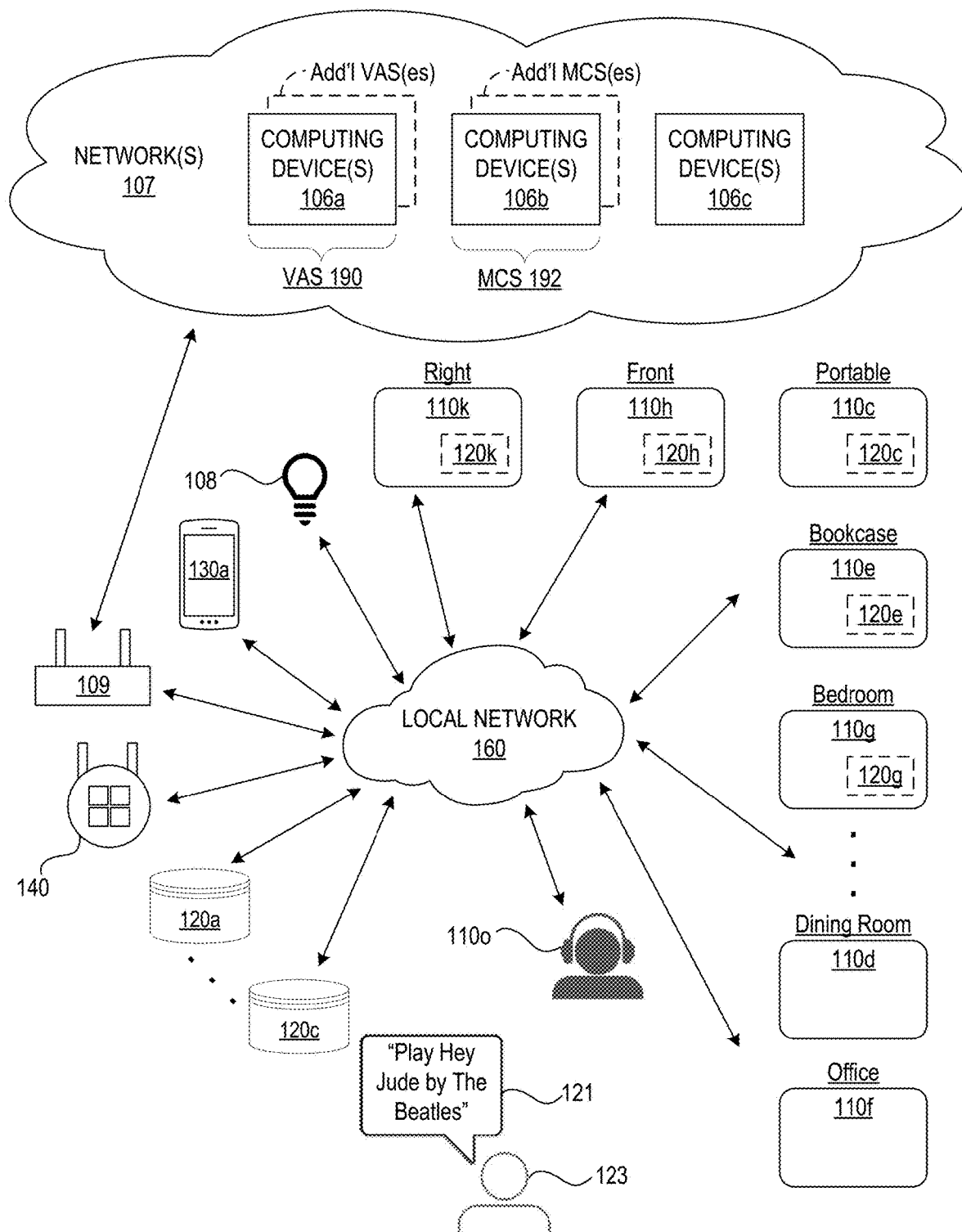
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110a) in synchrony with a second playback device (e.g., the playback device 110b). Interactions between the playback devices 110, NMDs 120, and/or control devices 130 of the MPS 100 configured in accordance with the various embodiments of the disclosure are described in greater detail below with respect to FIGS. 1B-1N.

In the illustrated embodiment of FIG. 1A, the environment 101 comprises a household having several rooms, spaces, and/or playback zones, including (clockwise from upper left) a Master Bathroom 101a, a Master Bedroom 101b, a Second Bedroom 101c, a Family Room or Den 101d, an Office 101e, a Living Room 101f, a Dining Room 101g, a Kitchen 101h, and an outdoor Patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101e, Master Bathroom 101a, Master Bedroom 101b, the Second Bedroom 101c, Kitchen 101h, Dining Room 101g, Living Room 101f, and/or the Patio 101i. In some aspects, a single playback zone may include multiple rooms or spaces. In certain aspects, a single room or space may include multiple playback zones.

In the illustrated embodiment of FIG. 1A, the Master Bathroom 101a, the Second Bedroom 101c, the Office 101e, the Living Room 101f, the Dining Room 101g, the Kitchen 101h, and the outdoor Patio 101i each include one playback device 110, and the Master Bedroom 101b and the Den 101d include a plurality of playback devices 110. In the Master Bedroom 101b, the playback devices 110l and 110m may be configured, for example, to play back audio content in synchrony as individual ones of playback devices 110, as a bonded playback zone, as a consolidated playback device, and/or any combination thereof. Similarly, in the Den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140 (FIG. 1B), and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the playback device 110o (FIG. 1B) may be a portable playback device that takes the form of a headphone device, while the playback device 110e on the bookcase may be a stationary device. As another example, the playback device 110c on the Patio 101i may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN"), such as the network 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio content, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the remote computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY®, PANDORA®, AMAZON MUSIC®, YOUTUBE MUSIC, APPLE MUSIC®, GOOGLE PLAY®, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, media content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include one or more remote computing devices 106c configured to perform certain operations, such as remotely facilitating media playback functions, managing device and system status information, directing communications between the devices of the MPS 100 and one or more VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to detect sound, including voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices MAY be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio 101i may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Pat. No. 10,499,146, issued Nov. 13, 2019 and titled "Voice Control of a Media Playback System," the contents of which are herein incorporated by reference in their entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude" performed by The Beatles. After these determinations, the VAS 190 may transmit a command to a particular MCS 192 to retrieve content (i.e., the song "Hey Jude" by The Beatles), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
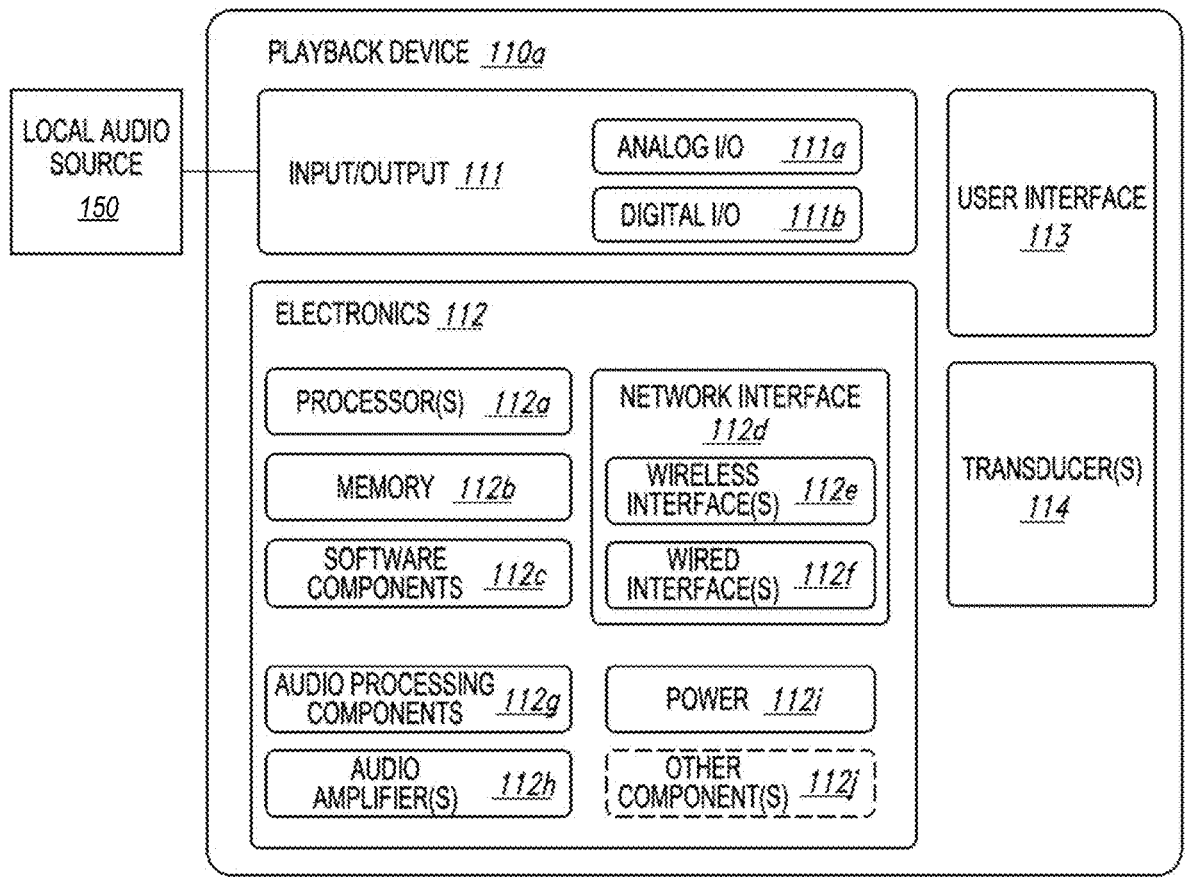
FIGS. 1C through 1E are block diagrams of example playback devices.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B), amplify the received audio, and output the amplified audio for playback via one or more of the transducers 114. In some embodiments, the playback device 110a optionally includes one or more microphones (e.g., a single microphone, a plurality of microphones, a microphone array) (hereinafter referred to as "the microphones"). In certain embodiments, for example, the playback device 110a having one or more of the optional microphones can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112a (referred to hereinafter as "the processors 112a"), memory 112b, software components 112c, a network interface 112d, one or more audio processing components 112g, one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operably coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," the contents of which are herein incorporated by reference in their entirety.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

In some implementations, the power components 112i of the playback device 110a may additionally include an internal power source (e.g., one or more batteries) configured to power the playback device 110a without a physical connection to an external power source. When equipped with the internal power source, the playback device 110a may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110a may include a speaker interface for connecting the playback device to external speakers. In other embodiments, the playback device 110a may include an audio interface for connecting the playback device to an external audio amplifier or audio-visual receiver.

Figure 1D:
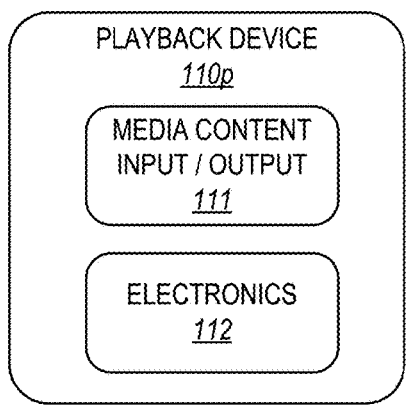

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "SUB," "BEAM," "ARC," "MOVE," "ERA," and "ROAM," among others. Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more of the playback devices 110 may comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110p comprising the input/output 111 and electronics 112 without the user interface 113 or transducers 114.

Figure 1E:
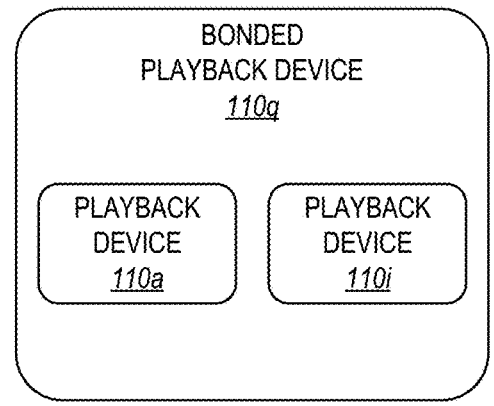

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110q includes additional playback devices and/or another bonded playback device.

Figure 2:
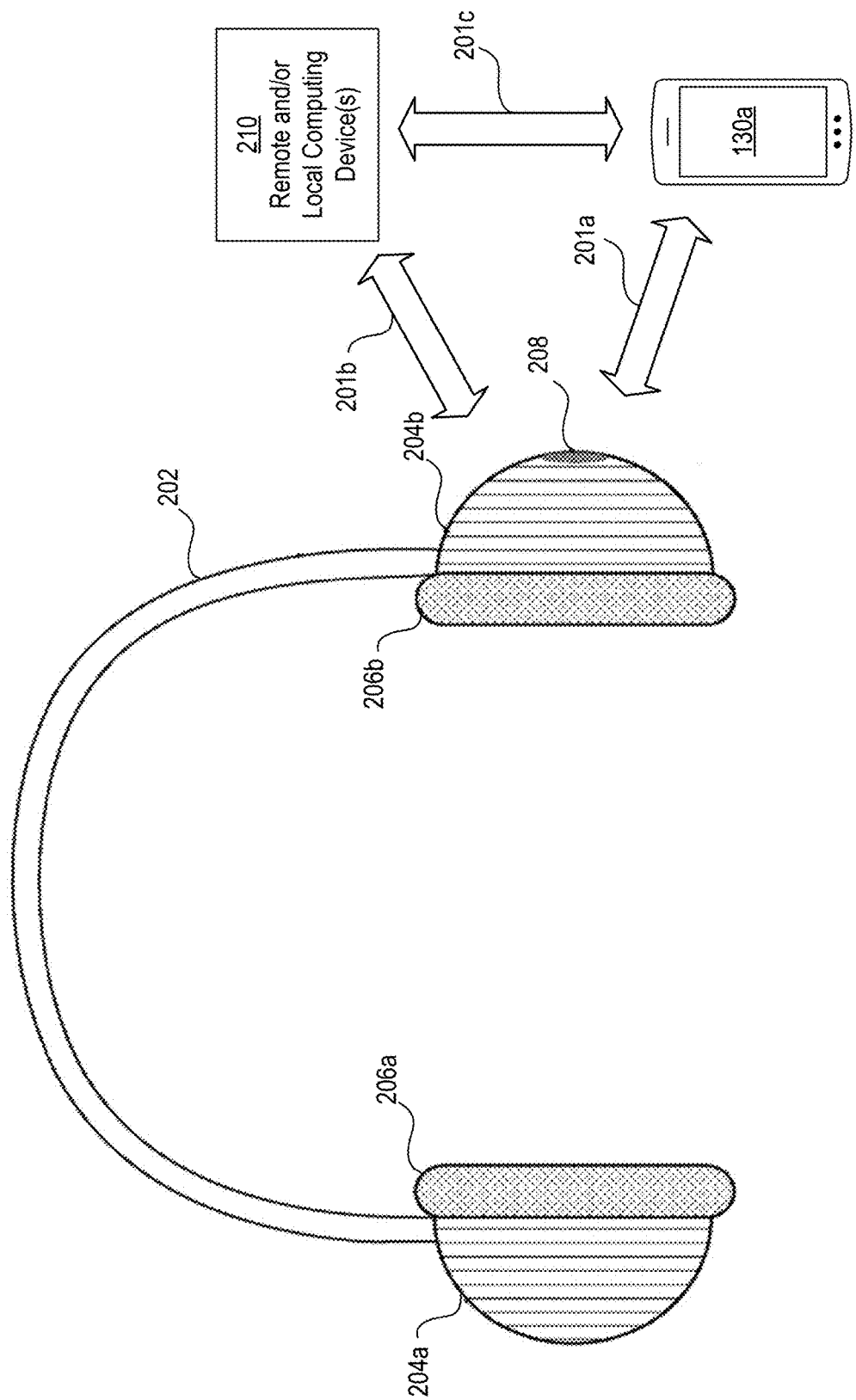
FIG. 2 is a diagram of an example headset assembly for an example playback device.

In some embodiments, one or more of the playback devices 110 may take the form of a wired and/or wireless headphone device (e.g., over-ear headphones, on-ear headphones, in-ear earphones, or some other wearable device, etc.). For instance, FIG. 2 shows an example headset assembly 200 ("headset 200") for such an implementation of one of the playback devices 110. As shown, the headset 200 includes a headband 202 that couples a first earcup 204a to a second earcup 204b. Each of the earcups 204a and 204b may house any portion of the electronic components in the playback device 110, such as one or more speakers. Further, one or both of the earcups 204a and 204b may include a user interface for controlling audio playback, volume level, and other functions. The user interface may include any of a variety of control elements such as a physical button 208, a slider (not shown), a knob (not shown), and/or a touch control surface (not shown). As shown in FIG. 2, the headset 200 may further include ear cushions 206a and 206b that are coupled to earcups 204a and 204b, respectively. The ear cushions 206a and 206b may provide a soft barrier between the head of a user and the earcups 204a and 204b, respectively, to improve user comfort and/or provide acoustic isolation from the ambient (e.g., passive noise reduction (PNR)).

As described in greater detail below, the electronic components of a playback device may include one or more network interface components (not shown in FIG. 2) to facilitate wireless communication over one more communication links. For instance, a playback device may communicate over a first communication link 201a (e.g., a BLUETOOTH link) with one of the control devices 130, such as the control device 130a, and/or over a second communication link 201b (e.g., a WIFI or cellular link) with one or more other computing devices 210 (e.g., a network router and/or a remote server). As another possibility, a playback device may communicate over multiple communication links, such as the first communication link 201a with the control device 130a and a third communication link 201c (e.g., a WIFI or cellular link) between the control device 130a and the one or more other computing devices 210. Thus, the control device 130a may function as an intermediary between the playback device and the one or more other computing devices 210, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

Figure 1F:
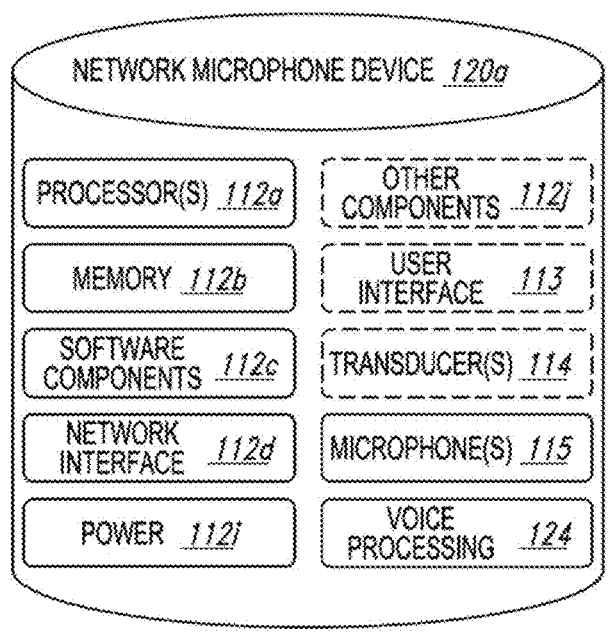
FIG. 1F is a block diagram of an example network microphone device.

FIG. 1F is a block diagram of the NMD 120a (FIGS. 1A and 1B). The NMD 120a includes one or more voice processing components 124 and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers).

Figure 1G:
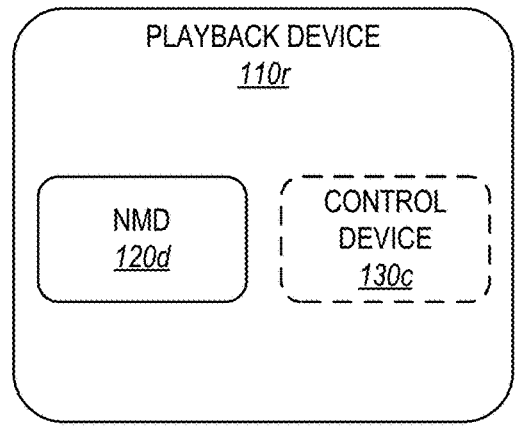
FIG. 1G is a block diagram of an example playback device that includes a network microphone device.

In some embodiments, an NMD can be integrated into a playback device. FIG. 1G is a block diagram of a playback device 110r comprising an NMD 120d. The playback device 110r can comprise any or all of the components of the playback device 110a and further include the microphones 115 and voice processing components 124 (FIG. 1F). The microphones 115 are configured to detect sound (i.e., acoustic waves) in the environment of the playback device 110r, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice processing components 124 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The NMD 120a may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
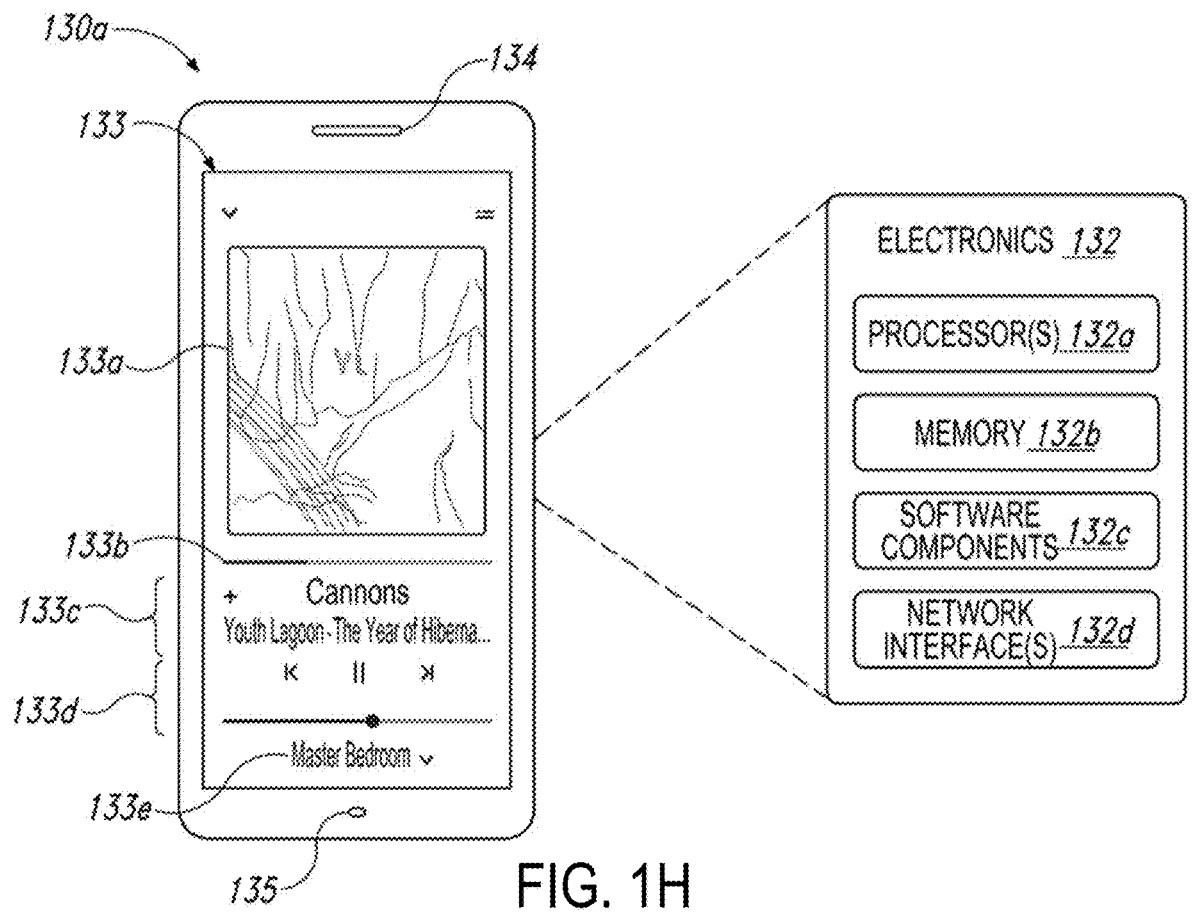
FIG. 1H is a partially schematic diagram of an example control device.

FIG. 1H is a partially schematic diagram of one example of the control device 130a (FIGS. 1A and 1B). As used herein, the term "control device" can be used interchangeably with "controller," "controller device," or "control system." Among other features, the control device 130a is configured to receive user input related to the MPS 100 and, in response, cause one or more devices in the MPS 100 to perform an action(s) and/or an operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processor(s) 132a"), a memory 132b, software components 132c, and a network interface 132d. The processor(s) 132a can be configured to perform functions relevant to facilitating user access, control, and configuration of the MPS 100. The memory 132b can comprise data storage that can be loaded with one or more of the software components executable by the processors 132a to perform those functions. The software components 132c can comprise applications and/or other executable software configured to facilitate control of the MPS 100. The memory 132b can be configured to store, for example, the software components 132c, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the remote computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 1N.

The user interface 133 is configured to receive user input and can facilitate control of the MPS 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1J:
FIGS. 1J through 1M are schematic diagrams of example media playback system zones.
Figure 1K:
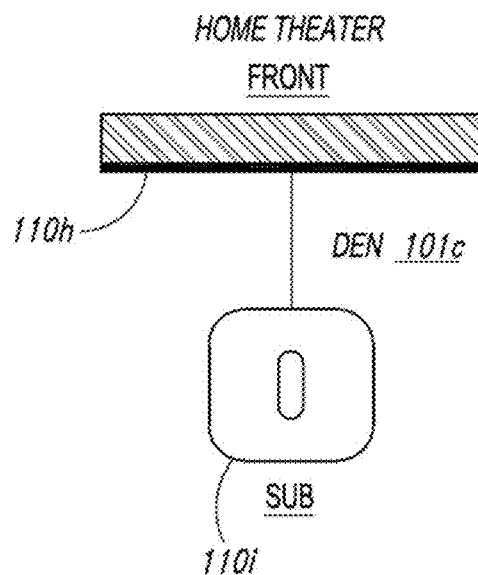
Figure 1L:
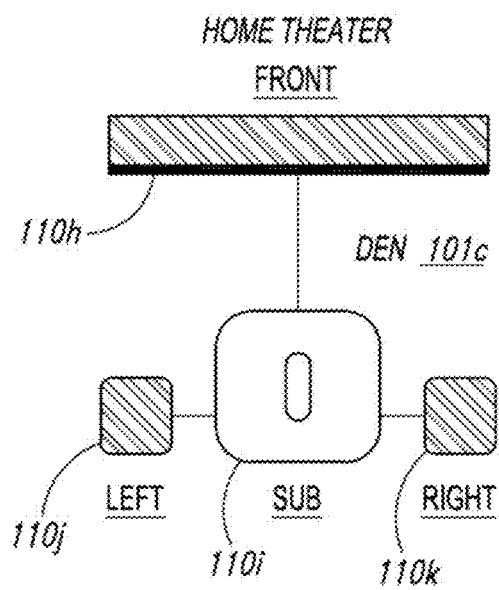
Figure 1M:
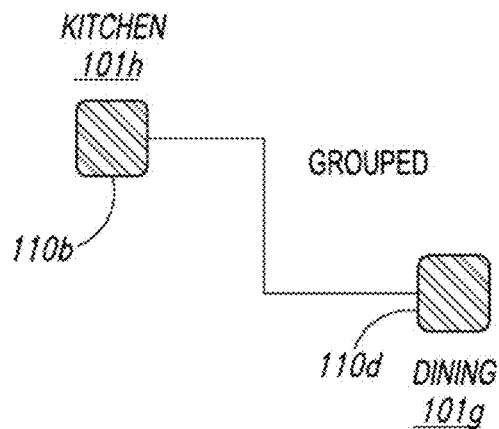
Figure 1N:
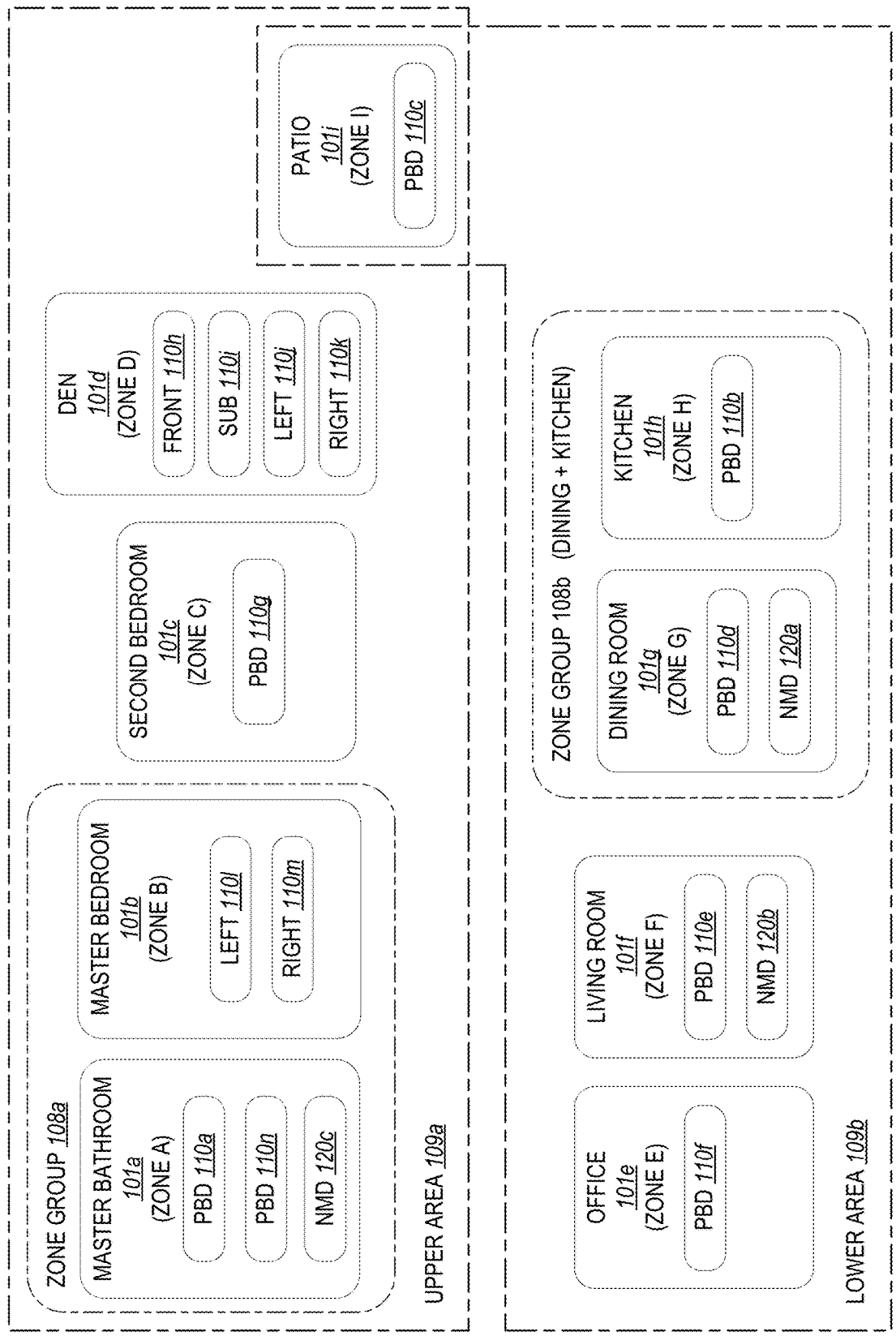
FIG. 1N is a schematic diagram of example media playback system areas.

FIGS. 1J, 1K, 1L, 1M, and 1N show example configurations of playback devices in zones and zone groups. Referring first to FIG. 1N, in one example, a single playback device may belong to a zone. For example, the playback device 110*g* in the Second Bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110*a* can be bonded to the playback device 110*n* and the NMD 120*c* to form Zone A. As another example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108*a*. As another example, the playback zones Zone G and Zone H can be merged to form Zone Group 108*b*. The merged playback zones Zone G and Zone H may not be specifically assigned different playback responsibilities. That is, the merged playback zones Zone G and Zone H may, aside from playing audio content in synchrony, each play audio content as they would if they were not merged and operating as independent zones.

Each zone in the MPS 100 may be represented for control as a single user interface (UI) entity. For example, Zone A may be represented as a single entity named Master Bathroom. Zone B may be represented as a single entity named Master Bedroom. Zone C may be represented as a single entity named Second Bedroom.

In some implementations, as mentioned above playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB playback device 110*i* can be configured to render low frequencies. When unbonded, however, the Front device 110*h* can be configured to render a full range of frequencies. As another example, FIG. 1L shows the Front and SUB playback devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 1N).

In other implementations, playback devices that are merged may not have assigned playback responsibilities and may each render the full range of audio content of which the respective playback device is capable. Nevertheless, merged devices may be represented as a single UI entity (i.e., a zone, as discussed above). For instance, the playback devices 110*a* and 110*n* in the Master Bathroom have the single UI entity of Zone A. In one embodiment, the playback devices 110*a* and 110*n* may each output the full range of audio content of which each respective playback devices 110*a* and 110*n* is capable, in synchrony.

In some embodiments, an NMD may be bonded or merged with one or more other devices so as to form a zone. As one example, the NMD 120*c* may be merged with the playback devices 110*a* and 110*n* to form Zone A. As another example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108*a* that includes the two zones, and Zone G may be grouped with Zone H to form the zone group 108*b*. However, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zone groups in an environment may be named by according to a name of a zone within the group or a combination of the names of the zones within a zone group. For example, Zone Group 108*b* can be assigned a name such as "Dining+Kitchen", as shown in FIG. 1N. In other implementations, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the Second Bedroom 101*c* may indicate (i) that the playback device 110*g* is the only playback device of the Zone C and (ii) that Zone C is not in a zone group. Identifiers associated with the Den 101*d* may indicate that the Den 101*d* is not grouped with other zones but includes bonded playback devices 110*h*-110*k*. Identifiers associated with the Dining Room 101*g* may indicate that the Dining Room 101*g* is part of the Dining+Kitchen Zone Group 108*b* and that devices 110*d* and 110*b* (Kitchen 101*h*) are grouped (FIGS. 1M, 1N). Identifiers associated with the Kitchen 101*h* may indicate the same or similar information by virtue of the Kitchen 101*h* being part of the Dining+Kitchen Zone Group 108*b*. Other example zone variables and identifiers are described below.

In yet another example, the MPS 100 may include variables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system," the contents of which are incorporated herein by reference in their entirety. In some embodiments, the MPS 100 may not implement Areas, in which case the system may not store variables associated with Areas.

Figure 3:
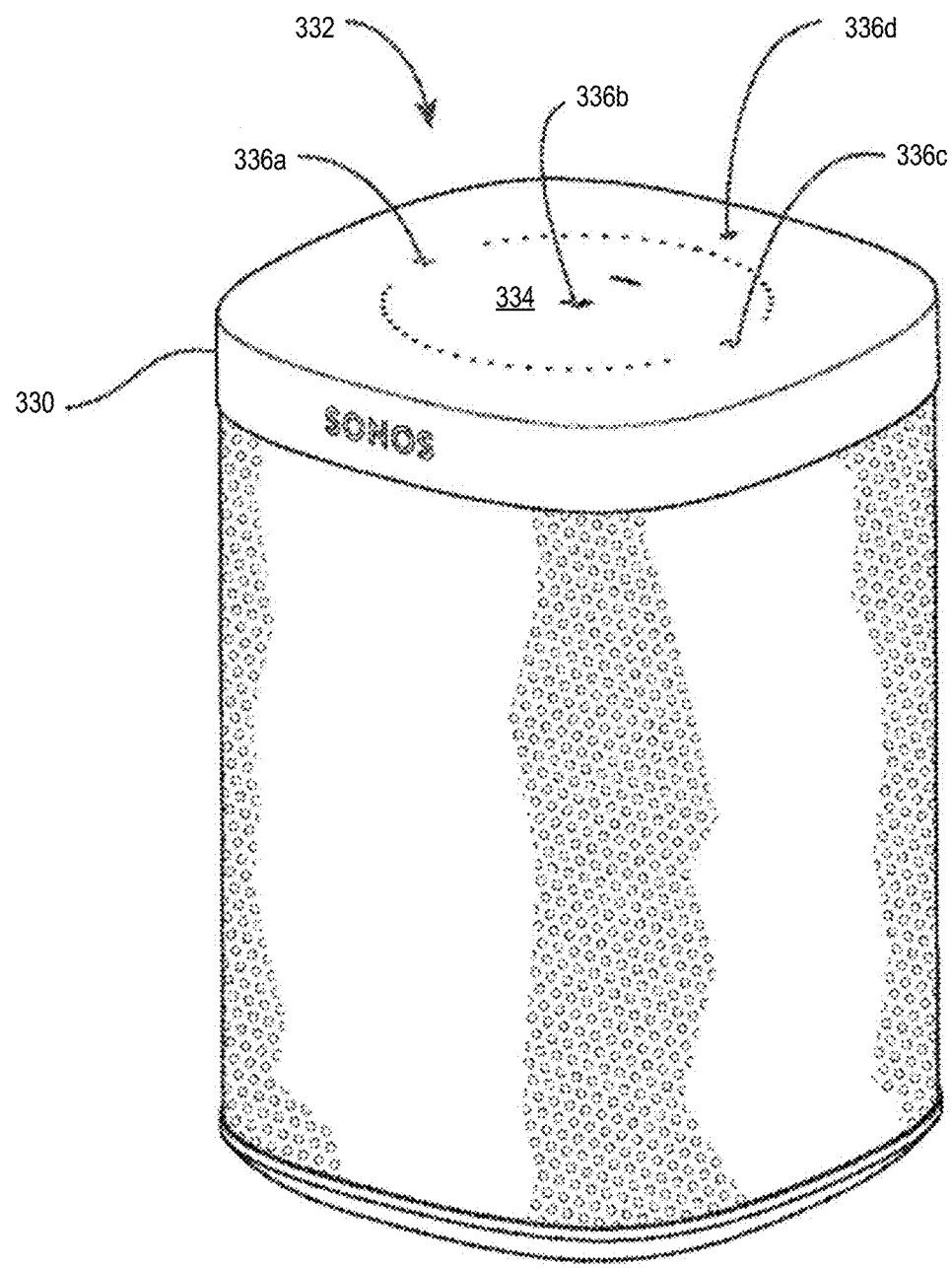
FIG. 3 is an isometric diagram of an example playback device housing.

FIG. 3 shows an example housing 330 of a playback device (e.g., one of the playback devices 110 discussed above) that includes a user interface in the form of a control area 332 at a top portion 334 of the housing 330. The control area 332 includes buttons 336*a*, 336*b*, and 336*c* for controlling audio playback, volume level, and other functions. The control area 332 also includes a button 336*d* for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device. The microphones may be arranged in various positions along and/or within the top portion 334 or other areas of the housing 330 so as to detect sound from one or more directions relative to the playback device.

f. Audio Content

Audio content may be any type of audio content now known or later developed. For example, audio content may include any one or more of: (i) streaming music or other audio obtained from a streaming media service, such as Spotify®, Pandora®, Apple Music, Sonos® Radio HD, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

Audio content that can be played by a playback device as described herein, including any of the aforementioned types of audio content, may also be referred to herein as media content. An audio source from which the media content is obtained may also be referred to herein as a media content source.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices may be referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

Additionally, or alternatively, the group coordinator playback device may distribute audio content to the playback devices that are configured to play back the audio content in accordance with one or more distribution schemes based on the computational capabilities of the playback devices. More information about such distribution schemes and playback device classes may be found in U.S. Patent Pub. No. 2022/0131511, filed Oct. 22, 2021, and titled "Techniques for Enabling Interoperability between Media Playback Systems," U.S. Patent Pub. No. 2022/0358187, filed May 10, 2022, and titled "Audio Encryption in a Media Playback System," and PCT Pub. No. WO 2022/240854, filed May 10, 2022, and titled "Audio Encryption in a Media Playback System," the contents of each of which are incorporated by reference herein in their entirety.

g. Example Playback Group

In an instance where two or more media playback devices of a local media playback system are grouped for synchronous playback of media content, monitoring and/or management of the media playback devices, the media playback system, and/or the media content being played back may be particularly desirable. As mentioned above, in a playback group comprising at least two playback devices that are grouped for synchronous playback of media content (which may be referred to herein as a synchrony group), at least one playback device may serve as a "group coordinator," and each other playback device of the group may serve as a group member. The playback group may be part of a local media playback system wherein each of the group coordinator and group members is configured to coordinate and/or communicate over a local data network (e.g., wireless local area network) that is provided by one or more local network devices (e.g., WIFI router).

Figure 4:
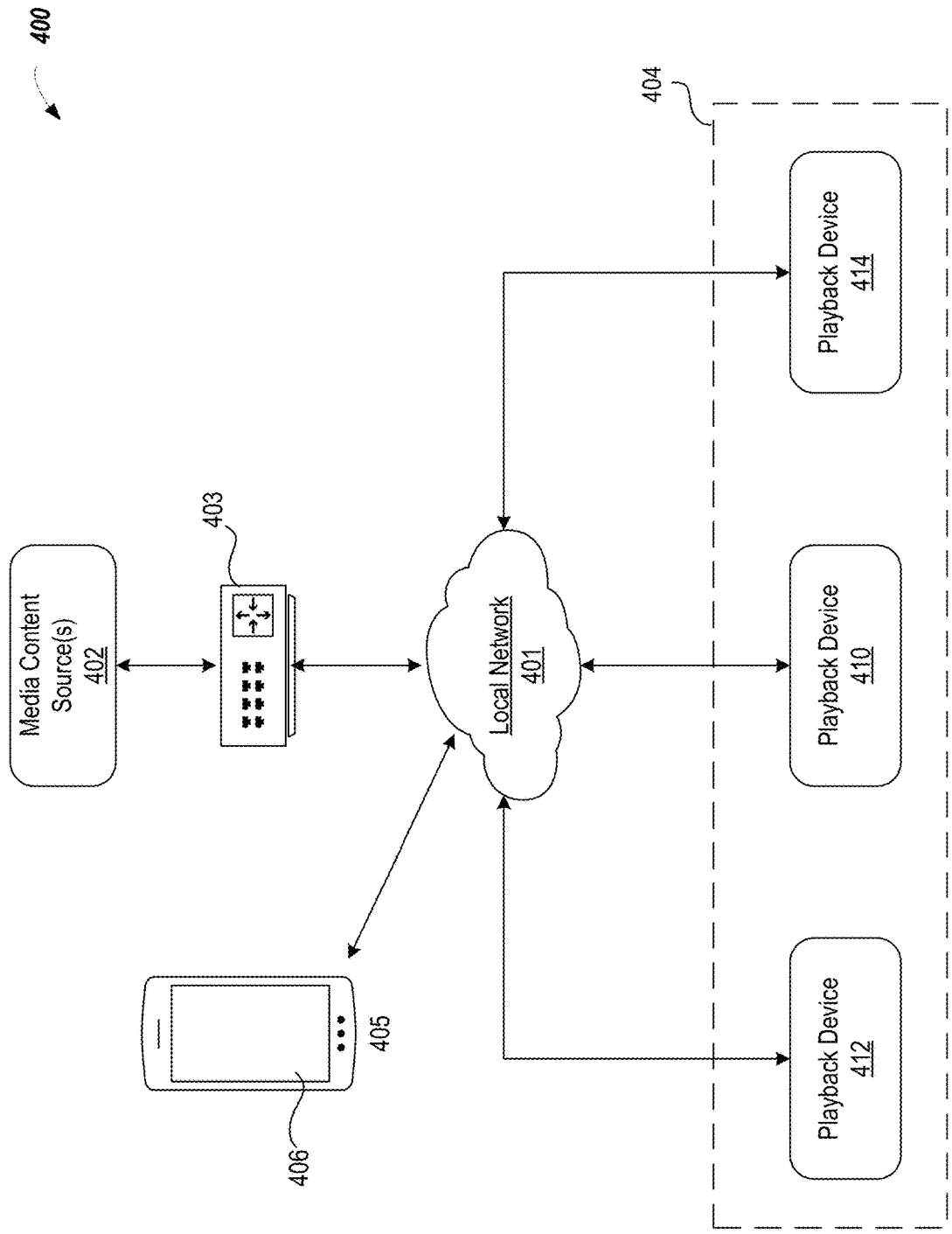
FIG. 4 is a diagram of an example media playback system configuration in which aspects of the disclosed technology may be implemented.

FIG. 4 depicts an example configuration of a local media playback system 400, which may resemble the MPS 100 shown in FIGS. 1A-1B. In the MPS 400 shown in FIG. 4, each of the playback devices 410, 412, and 414 may be part of a synchrony group 404 such that the playback devices 410, 412, and 414 are grouped for synchronous playback of media content and configured to coordinate and/or communicate over a wireless local area network 401. The local network 401 may be provided by an access point, such as a local WIFI router 403, which may resemble the router 109 of FIG. 1B. The local network 401 may also be used to communicate with one or more remote computing devices associated with one or more media content sources 402 (which may resemble the computing device(s) 106b and MCS 192 and of FIG. 1B) for retrieval of media content. The MPS 400 may also include a control device 405 that includes a user interface 406 for enabling a user to interact with the MPS 400 and perform various actions, such as configuring a home theater system, as will be discussed further below. The control device 405 and user interface 406 may resemble the control device 130a and user interface 133 of FIGS. 1H and 1I.

In the example of FIG. 4, the playback device 410 may serve as the group coordinator, and the playback devices 412 and 414 may serve as group members. However, it should be understood that either of the playback devices 412 or 414, or any other playback device(s) of the playback group 404 not shown in FIG. 4, may serve as a group coordinator in other examples. Further, although the playback group 404 shows only two additional group members 412 and 414 grouped with the group coordinator 410 for synchronous playback, it should be understood that any number of playback devices may be included in the playback group 404.

As group coordinator, the playback device 410 may generally be responsible for various tasks, including but not limited to identifying (and/or retrieving) media content for playback by the group members of the playback group, monitoring playback device characteristics of one or more group members, monitoring network characteristics associated with the network device and one or more group members, monitoring group characteristics, and dynamically modifying media content for playback based on a change in one or more characteristics. To facilitate performance of these and other tasks, a playback device (such as the group coordinator 410 of FIG. 54 may generally have access to numerous types of media content sources, such as audio and video streaming services, content libraries, and local device storage, among other examples.

Additional information about setting up media playback devices within a media playback system can be found in U.S. Patent Pub. No. 2022/0104015, filed Sep. 24, 2021, and titled "Intelligent Setup for Playback Devices," the contents of which are incorporated herein by reference in their entirety.

III. Example Techniques for Intelligent Home Theater Configuration

As previously mentioned, many modern users prefer to have increased options for creating personalized digital media playback experiences. Further, as consumer-accessible digital media technologies become more sophisticated, users expect more intelligent behavior from media playback systems.

With that in mind, Sonos has developed new technology that comprises (i) techniques for intelligent configuration of home theater systems and (ii) techniques for facilitating user adjustment of home theater system characteristics.

a. Intelligent Home Theater Configuration

As discussed above, playback devices of a local media playback system can be grouped in various ways, such as a setup that forms a home theater system (e.g., FIGS. 1K-1L). In general, a home theater system comprises a given number of component devices that are each placed in a given physical location of an environment occupied by the home theater system in order to create a surround sound immersive listening experience. Each component device may be responsible for playing back a particular channel of audio in order to create the surround sound experience. A home theater system setup is depicted by a numerical notation including a first value indicating a number of audio channels that are supported by the home theater system, (e.g., front, left, and right audio channels that provide sound on a horizontal plane), a second value indicating a number of subwoofers that are included in the home theater system, and optionally a third value indicating a number of "height" or "upward-firing" speakers (e.g., speakers that provide sound on a vertical plane). A home theater configuration typically includes at least one speaker capable of providing left-channel and right-channel audio and at least one subwoofer. Example home theater configurations include a 3.1 configuration (e.g., at least one speaker capable of supporting three audio channels and one subwoofer), a 5.1 configuration (e.g., at least one speaker capable of supporting five audio channels and one subwoofer), a 5.2 configuration (e.g., at least one speaker capable of supporting five audio channels and two subwoofers), a 7.1 configuration (e.g., at least one speaker capable of supporting seven audio channels and one subwoofer), or a 7.2.4 configuration (e.g., at least one speaker capable of supporting seven audio channels, two subwoofers, and four speakers capable of providing "vertical" sound), among other possibilities. Further, depending on the number of playback devices involved, a configuration may be either a "simulated" configuration—wherein at least one speaker in the home theater system is responsible for supporting multiple audio channels (e.g., a 3.1 simulated configuration comprising one speaker that supports front-channel, left-channel, and right-channel audio (e.g., a soundbar) and one subwoofer, similar to the configuration shown in FIG. 1K)—or a "true" configuration—wherein each speaker in the home theater system is responsible for supporting a given audio channel (e.g., a 3.1 true configuration comprising a first speaker for center-channel audio, a second speaker for left-channel audio, a third speaker for right-channel audio, and one subwoofer). Other examples are also possible.

As the range and capabilities of consumer-accessible home theater-capable devices continue to grow, options for home theater system configurations are increasing as well. For instance, consumers can expand their home theater systems to include additional component devices that differ from conventional configurations (e.g., 3.1, 5.1, etc.) in order to create a more personalized, listening experience.

However, existing technology for setting up and managing a home theater system may not provide users with flexibility to create many of the home theater configurations discussed above. For instance, existing technology for setting up and managing a home theater system may only provide users with one, or a relatively limited number of default home theater configuration options. This type of setup fails to contemplate different variations of home theater configurations that may possibly be formed based on the available playback devices of the user's media playback system. For instance, a user may wish to select a home theater system configuration that comprises fewer component devices than required during a typical setup (e.g., a front soundbar, a left surround speaker, a right surround speaker, and no rear speakers), or more component devices than required during a typical setup (e.g., both surround and rear-channel speakers, additional subwoofers, etc.). As another possibility, a user might not be aware of additional home theater configuration possibilities that might be achieved based on the available playback devices of the user's media playback system.

Accordingly, in one aspect, the software technology disclosed herein relates to techniques for intelligent configuration of a home theater system based on available playback devices (e.g., playback devices of a local media playback system that are available for inclusion in the home theater system). For example, in one embodiment, the disclosed software technology provides a user with a set of possible home theater system configuration options that can be formed based on available playback devices. In another embodiment, the disclosed software technology enables a user to choose which available playback devices to include in the home theater system. Other examples are also possible.

Figure 5:
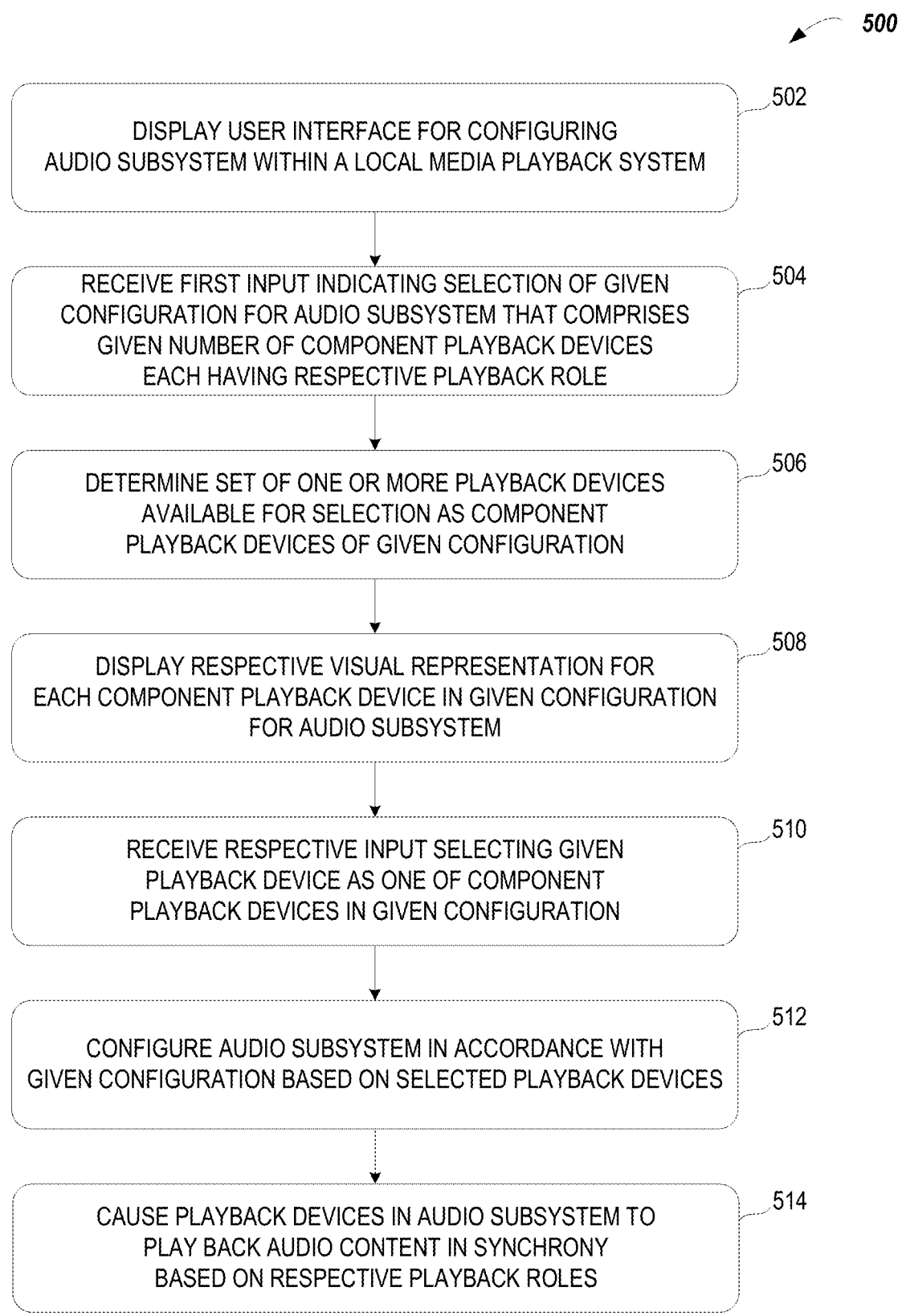
FIG. 5 depicts a flow diagram of one example process for configuring an audio subsystem within a local media playback system in accordance with aspects of the disclosed technology.

Turning now to FIG. 5, a flowchart depicting operations of an example process 500 for configuring a home theater system is shown. The example process 500 includes operations, functions, or actions as illustrated by blocks 502-514. Although blocks 502-514 are illustrated in sequential order, these blocks may also be performed in parallel, and/or in a different order than those described herein. Also, the various blocks may be combined into fewer blocks, divided into additional blocks, and/or removed based upon different implementations.

In addition, for the example process 500, and any other processes and methods disclosed herein, each flowchart depicts functionality and operation of one possible implementation of present embodiments. In this regard, each block may represent a module, a segment, or a portion of program code, which includes one or more instructions executable by one or more processors for implementing specific logical functions or steps in the process. The program code may be stored on any type of computer-readable medium, such as a storage device including a disk or hard drive, among other possibilities. The computer-readable medium may include non-transitory computer-readable medium, such as computer-readable media that stores data for short periods of time like register memory, processor cache and Random Access Memory (RAM), among other possibilities. The computer-readable medium may also include non-transitory media, such as secondary or persistent long term storage, like read only memory (ROM), optical or magnetic disks, compact-disc read only memory (CD-ROM), among other possibilities. The computer-readable media may also be any other volatile or non-volatile storage systems. The computer-readable medium may be considered a computer-readable storage medium, for example, or a tangible storage device. In addition, for the example process 500 shown in FIG. 5 (and any other processes and methods depicted herein), each block may represent circuitry that is wired to perform the specific logical functions in the process.

In practice, the example process 500 may be carried out by a computing device, such as a control device 130 operating within the MPS 100 shown in FIG. 1A or 1B or the control device 405 of FIG. 4 operating within the MPS 400 shown in FIG. 4. The following discussion of the example process 500 shown in FIG. 5 and related examples will generally be presented with reference to the control device 405 (e.g., a smartphone device) that is being used to access the user interface 406 for setting up a home theater system that includes one or more playback devices of a local media playback system, such as the MPS 400, that is operating on a user's home WIFI network, such as the local network 401 shown in FIG. 4. However, it should be understood that the operations depicted in FIG. 5 may be carried out by other types of computing devices, in other environments, and may involve other types of data networks.

The example process 500 may begin at block 502, where the control device 405 may display a user interface that enables configuration of an audio subsystem (e.g. a home theater system) within a local media playback system (e.g., MPS 400). In practice, the user interface may be accessed by a user by launching a media playback system controller application (e.g., a mobile application, a desktop application, etc.) for managing media playback systems (e.g., the Sonos S2 controller application) that incorporates the disclosed software technology and then selecting an option for configuring a home theater system. After receiving an indication that the user has selected the option for configuring the home theater system, the control device 405 may display one or more user interface views (e.g., a home theater configuration wizard) for guiding the user through a process for configuring the home theater system. The one or more user interface views may include a set of one or more home theater configuration options that the control device 405 has determined are available for selection. One having ordinary skill in the art will appreciate that the user may initiate configuration of the home theater system as described herein for the purposes of setting up a new home theater system or reconfiguring an existing home theater system.

The function of determining the set of home theater configuration(s) may take various forms. In one implementation, the control device 405 may begin by identifying each playback device of the MPS 400 that is available for inclusion in the home theater system, which may take various forms. For instance, the control device 405 may obtain information about all playback devices that have been set up within the MPS 400 and then identify each playback device that meets some criteria indicating that the playback device is available to be included in a home theater system within the MPS 400. Such criteria may take various forms, including as some examples, whether the playback device is within a threshold distance of a media display device of the MPS, or whether the playback device is within a same area and/or zone of the media display device. As another possibility, the control device 405 may determine that, based on the set of available home theater configurations, certain types of playback devices may only be included in pairs. For example, a playback device that may act as a left or right surround speaker might not be included in a list of available devices if a second, corresponding playback device (e.g., a playback device of the same model) is also available to complete the pair of surround speakers. Other possibilities also exist.

Further, the control device 405 may obtain the information about which playback devices are included and available within the MPS 400 in various ways, some examples of which include obtaining that information from a computing device (e.g., a remote computing device) that is configured to store information about the MPS 400, or by detecting (e.g., over the local WIFI data network or over a Bluetooth data network, etc.) playback devices that are present within the environment of the local MPS. The control device 405 may identify those playback devices that are available for inclusion in the home theater system in other ways as well, including combinations of one or more of the above.

After identifying the playback devices that are available for inclusion in the home theater system, the control device 405 may determine each home theater configuration option that is possible based on the identified playback devices. For instance, as one example, the control device 405 may determine that five playback devices with respective capabilities are available to be added to the home theater system, and those five playback devices can be selected as component devices of three different home theater configurations. The control device 405 may include an option for each of the three determined home theater configurations in the set of one or more home theater configuration options that is displayed via the user interface 406.

The manner in which the set of home theater configuration option(s) is displayed may take various forms.

As one possibility, the set of home theater configuration option(s) may be presented via a set of respective user interface views that the user can scroll through. Each user interface view may include information about a given home theater configuration option, such as component playback devices, channels, and/or playback roles that the given configuration option includes. The user may then select a given home theater configuration that is to be configured.

Figure 6A:
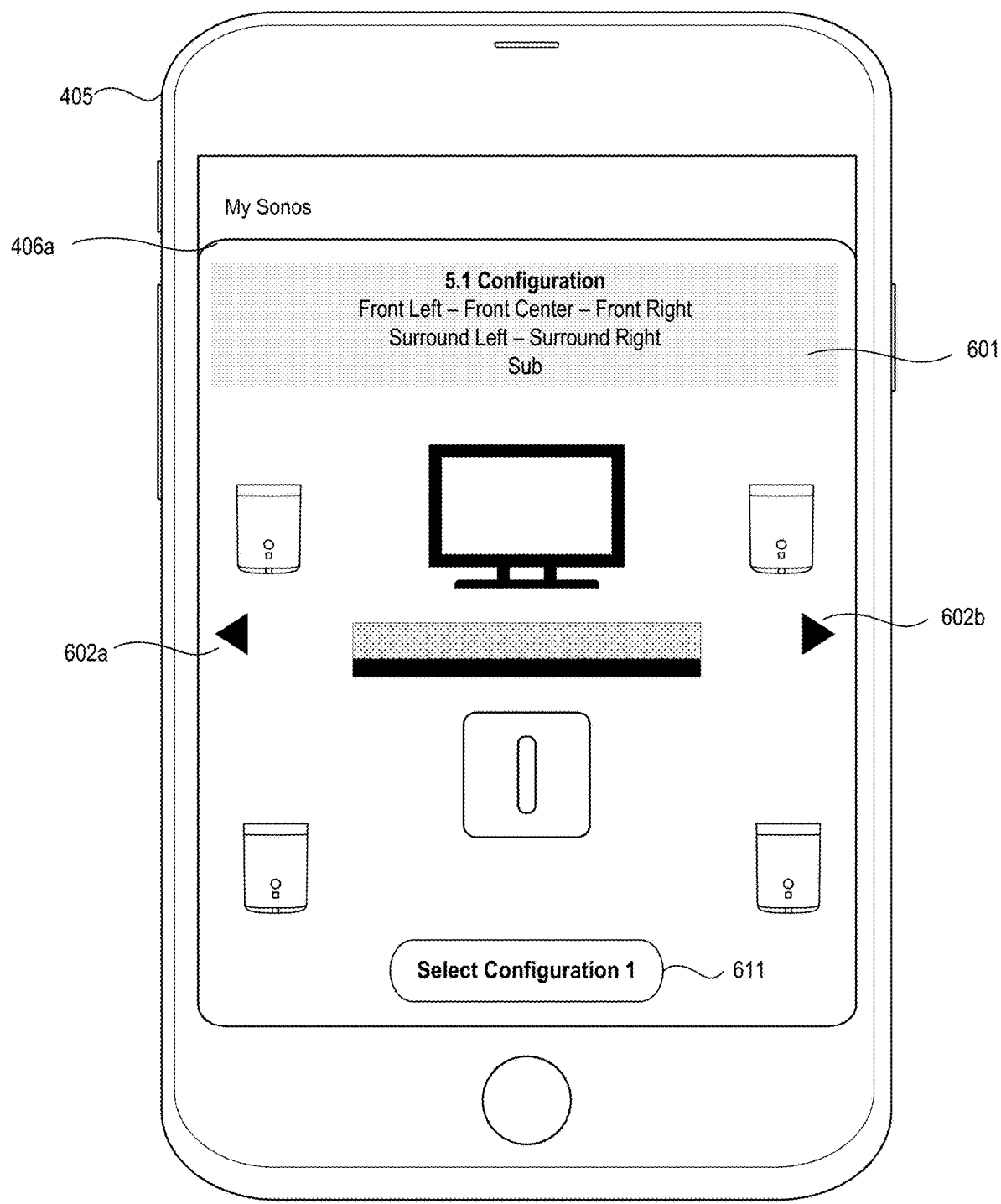
FIG. 6A depicts an example of an interface view that includes an audio subsystem configuration option that may be selected for configuring an audio subsystem in accordance with aspects of the disclosed technology.
Figure 6B:
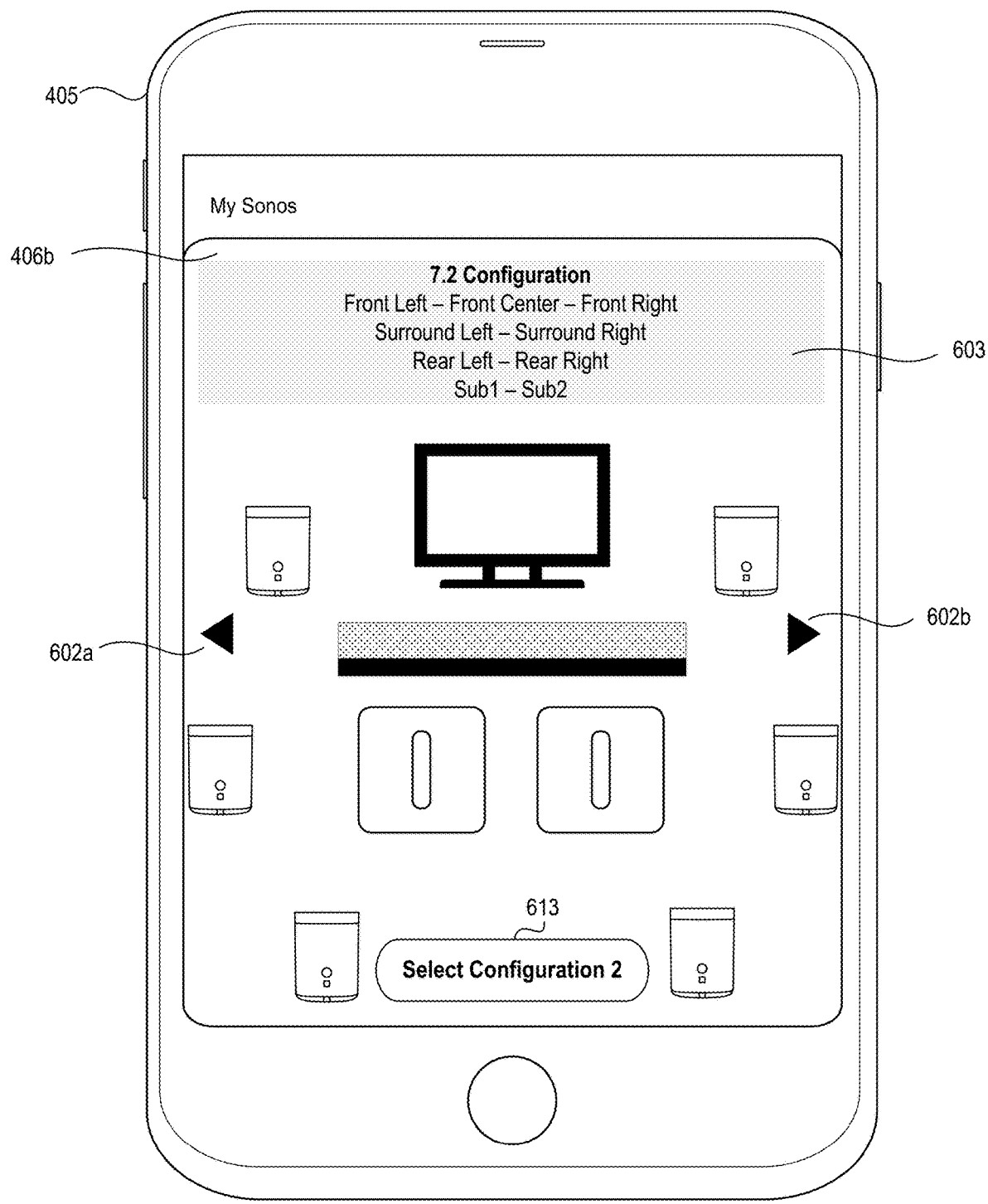
FIG. 6B depicts an example of an interface view that includes another audio subsystem configuration option that may be selected for configuring an audio subsystem in accordance with aspects of the disclosed technology.

To illustrate with examples, FIGS. 6A and 6B depict example user interface views comprising respective home theater configuration options that may be presented by the control device 405. The example view 406*a* shown in FIG. 6A includes a notification 601 that provides information about a first configuration option in accordance with which the home theater system may be configured, along with a visual diagram of the component playback devices of the first configuration. The information includes a listing of component audio channels that are included in the first configuration option. As shown, the first configuration option comprises a true 5.1 configuration that includes five component playback devices for supporting front left-channel audio, front center-channel audio, front right-channel audio, surround left-channel audio, surround right-channel audio, and one subwoofer. As will be appreciated with reference to FIG. 6B described below, the home theater configuration shown in the example view 406*a* may include some, but not all, of the available playback devices within the MPS 400 that were identified by the control device 405 for possible inclusion in the home theater system.

The interface view 406*a* further includes selectable graphical user interface (GUI) elements 602*a* and 602*b* that can be used to navigate to a different view that provides information about a different configuration option. For instance, the user may select the GUI element 602*b* to cause the control device 405 to display a different interface view showing a different configuration option, such as the interface view shown in FIG. 6B, which will be discussed below. Further still, the interface view 406*a* includes a GUI element 611 for selecting the first configuration option as the configuration in accordance with which to configure the home theater system.

FIG. 6B depicts an example interface view 406*b* that may be displayed upon selection of the element 602*b* from the interface view shown in FIG. 6A to display a succeeding configuration option (or upon selection of the element 602*a* from a third interface view (not shown) to display a preceding configuration option). The interface view 406*b* includes a notification 603 that provides information about a second configuration option in accordance with which the home theater system may be configured, along with a visual diagram of the component playback devices of the second configuration. As shown, the second configuration option comprises a true 7.2 configuration that includes seven component playback devices for supporting front left-channel audio, front center-channel audio, front right-channel audio, surround left-channel audio, surround right-channel audio, rear left-channel audio, rear right-channel audio, and two subwoofers. In this regard, the control device 405 may have determined that a sufficient number of playback devices were available within the MPS 400 to provide the true 7.2 configuration as a selectable option.

In line with the discussion above, the interface view 406*b* includes the selectable GUI elements 602*a* and 602*b* that can be used to navigate to a different view that provides information about a different configuration option. For instance, the user may select the GUI element 602*a* to cause the control device 405 to display a preceding configuration option, such as the interface view 406*a* shown in FIG. 6A, or select the GUI element 602*b* to cause the control device 405 to display a succeeding configuration option, such as a third interface view (not shown) indicating a third configuration option. Further yet, the interface view 406*b* includes a GUI element 613 for selecting the second configuration option as the configuration in accordance with which to configure the home theater system.

In view of the discussion above, it will be understood that numerous additional home theater configuration options are possible based on the number and general type of playback devices shown in FIG. 6B, and that each of these configurations may be included in the list of options that may be presented by the control device 405 (e.g., by selecting one or both of the GUI elements 602*a* or 602*b* to scroll through them). As some examples, the control device 405 may present a configuration option for a simulated 5.1 configuration (e.g., a true 3.1 configuration), a simulated 5.2 configuration, a true 5.0 configuration, a true 6.2 configuration (e.g., including a single, centrally location rear speaker), a simulated 7.2 configuration, a true 7.1 configuration, and so on. In some implementations, the control device 405 may cease to display the GUI element 602*b* in an interface view that depicts a final configuration option in the list of available configuration options, thereby indicating to the user that no additional configuration options are available. In other implementations, selecting the GUI element 602*b* while viewing an interface view that depicts the final configuration option may cause the control device 405 to display the first configuration option, thereby enabling the user to use the GUI elements 602*a* and 602*b* to cycle through the available configuration options in any direction (e.g., in a "backward" direction by selecting the element 602*a* and/or a "forward" direction by selecting the element 602*b*).

The set of home theater configuration option(s) may be presented in other ways as well. For example, as another possibility, the set of home theater configuration option(s) may be presented in the form of a GUI list that may be expandable to view a selectable representation for each configuration option. Many other examples are possible as well.

Returning to FIG. 5, at block 504, the control device 405 may receive a user input indicating a selection of a given configuration in accordance with which the home theater system is to be configured. In turn, at block 506, the control device 405 may determine a set of one or more playback devices of the MPS 400 that are each available to be selected as a component playback device of the given configuration. In some implementations, the operation of block 506 may be performed after or in conjunction with the operation discussed above with respect to block 502, where the control device 405 identifies the playback devices of the MPS 400 and determines the set of possible home theater configuration options that can be formed based on those playback devices.

At block 508, the control device 405 may display a respective visual representation for each playback device of the MPS 400 that can be selected as a component playback device of the given configuration. The respective visual representations may take various forms. As one possibility, the visual representation may take the form of an image, an icon, or a similar identifier that corresponds to the playback device. In some implementations, the respective visual representation of each playback device may also include a textual identifier for the playback device, such as a name for the playback device that has been designated by the user. Additionally or alternatively, the respective visual representation of each playback device may include an identification of a preferred corresponding component playback device and/or audio channel (e.g., front left, rear right, center, etc.) for the playback device. Further, the respective visual representations may be arranged in a visual diagram that corresponds to the given configuration. The visual representations may take other forms as well.

Figure 6C:
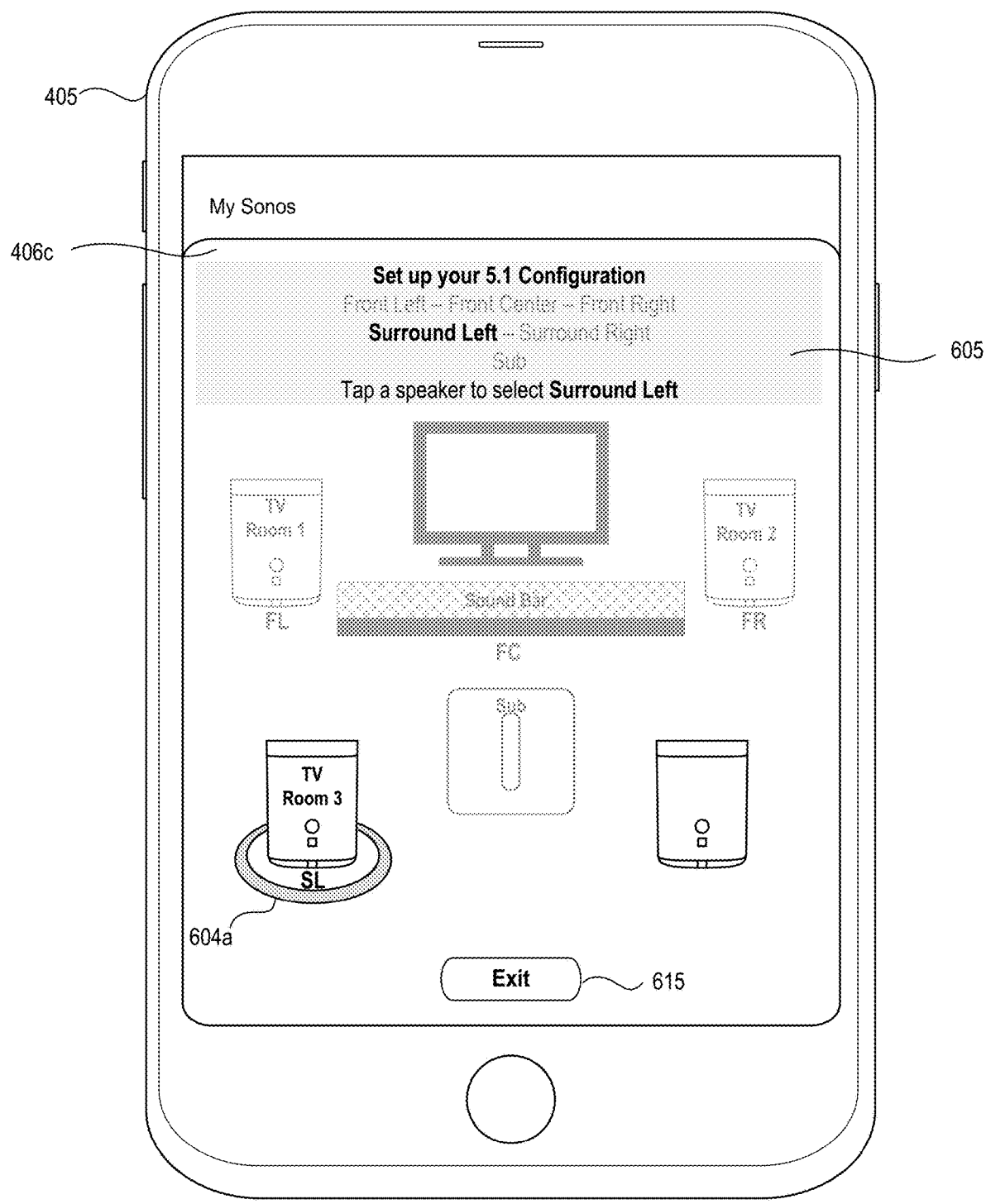
FIG. 6C depicts an example of an interface view that enables selection of a media playback device as a component playback device of a given audio subsystem configuration in accordance with aspects of the disclosed technology.

To illustrate with an example, consider FIG. 6C, which depicts an example interface view 406c that may be displayed after a user has selected "Configuration 1" (e.g., the 5.1 configuration shown in FIG. 6A) as the given configuration for the home theater system. The interface view 406c includes respective visual representations for each component playback device of the given configuration (e.g., a front left). Further, the interface view 406c includes an instruction, as shown in a notification 605 and an accompanying indicator 604a, for the user to select a given playback device of the MPS 400 as the "Surround Left" component playback device. In some implementations, such as in the example shown in FIG. 6C, a preferred playback device (e.g., a playback device named "TV Room 3") may initially be indicated for selection as the "Surround Left" component playback device, although the user may opt to select a different playback device that is to serve as the "Surround Left" component playback device. For instance, the user may select the visual representation of the "Surround Left" component playback device on the interface view 406c, which may cause a pop-up window to be displayed that includes a list of available playback device that may selected to serve the role of the "Surround Left" component playback device. As another possibility, the user might cycle through available options by swiping across the visual representation of the "Surround Left" component playback device on the interface view 406c, which may cause the indication of the "TV Room 3" playback device to be replaced by another available playback device that may be selected as the "Surround Left" component playback device. Other examples are also possible.

In this regard, it will be appreciated that only those playback devices that are eligible to serve as the given component playback device indicated in the instruction may be presented as available for selection. For instance, the user may have already provided inputs to select the "TV Room 1," "Sound Bar," and "TV Room 2" playback devices as the front left, front center, and front right component playback devices, respectively, of the given configuration, as indicated by the "FL," "FC," and "FR" notations accompanying the respective visual representations of each of these component playback devices. Therefore, those playback devices may not appear as selectable options for the "Surround Left" component playback device. The "Sub" playback device, which is a subwoofer device, may also be unavailable for selection as the "Surround Left" component playback device because the control device 405 may determine that the subwoofer does not have the required audio playback capability (e.g., output capability within a given frequency range) to perform the role of the "Surround Left" component playback device or is better suited for a different role (e.g., the control device may determine that if the subwoofer is selected to perform the role of the "Surround Left" component playback device, no other playback device might be capable of replacing the role of the subwoofer, and thus the subwoofer should not be presented as an option to serve as the "Surround Left" component playback device). More information about audio playback roles and audio playback capabilities can be found in U.S. Pat. Pub. No. 2022/0358943, filed May 10, 2022, and entitled "Dynamic Transcoding for Enhancing Audio Playback," the contents of which are herein incorporated by reference in their entirety. The interface view 406c additionally includes an "Exit" GUI button 615 that can be selected to exit the interface view 406c. For instance, the user may wish to return to the set of configuration options to select a different given configuration for the home theater system, or may wish to exit the configuration process altogether and configure the home theater system at a later time.

Returning to FIG. 5, at block 510, the control device 405 may receive a respective input that indicates a selection of a given playback device as a given component playback device of the given configuration. In some implementations, the control device 405 may dynamically update the respective visual representations presented to the user based on input provided by the user. For instance, with reference to FIG. 6C, the control device 405 may have updated a previously-displayed user interface view to present the interface view 406c to gray out one or more of the "TV Room 1," "Sound Bar," and "TV Room 2" playback devices that were selected as component playback devices. Similarly, the control device 405 may update the interface view 406c after the user has selected the "TV Room 3" playback devices as the "Surround Left" component playback device.

Figure 6D:
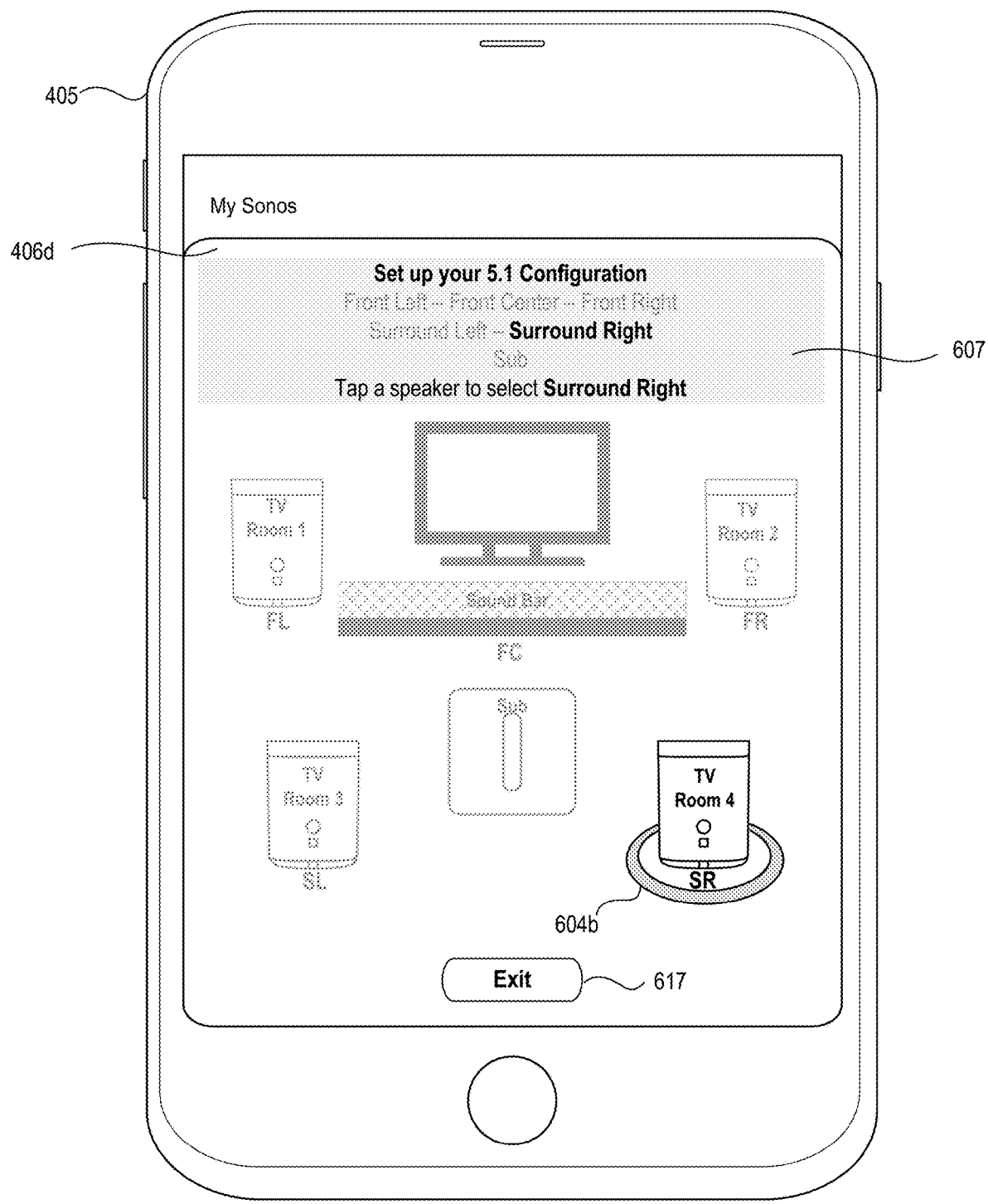
FIG. 6D depicts an example of another interface view that enables selection of a media playback device as a component playback device of a given audio subsystem configuration in accordance with aspects of the disclosed technology.

For example, turning to FIG. 6D, an example interface view 406d is shown. The interface view 406d may be presented to the user after the user has selected the "TV Room 3" playback device to serve as the "Surround Left" component playback device. The interface view 406d includes a notification 607, similar to the notification 605 shown in FIG. 6C, that comprises the listing of the component playback devices of the given configuration, along with an instruction for the user to select a given playback device of the MPS 400 as the "Surround Right" component playback device. As shown in FIG. 6D, the visual representation of the "Surround Left" playback device has now been grayed out, indicating that the "TV Room 3" playback device has been selected as the "Surround Left" component playback device. The interface view 406d further includes an indicator 604b that indicates that the role of the "Surround Right" component playback device is currently open for selection. In line with the discussion above, a default playback device (e.g., the only eligible playback device remaining) such as "TV Room 4" may be shown, although the user may select a different playback device if other options are available. Further, the interface view 406d includes an "Exit" GUI button 617 that can be selected to exit the interface view 406d.

Although not shown in FIG. 6C or 6D, in some implementations, the interface views 406c and/or 406d may additionally include an option for skipping selection of a given component device. In this way, the user may effectively select a different home theater configuration during setup without needing to exit the setup process and start over. For example, after initially selecting a true 7.1 configuration for setup, the user may skip selection of the component rear speakers, which may result in setting up a true 5.1 configuration instead.

After receiving respective inputs selecting a playback device for each component playback device of the given configuration, the control device 405 may proceed with configuring the home theater system in accordance with the given configuration.

For instance, returning to FIG. 5, at block 512, the control device 405 may configure the home theater system in accordance with the given configuration (e.g., 5.1 Configuration) based on the selected playback devices. For example, the control device 405 may transmit to each playback device, information about the playback device's respective playback role (e.g., which channel of audio the playback device is to play back). Further, the control device 405 may cause the selected playback devices to form a synchrony group such that the playback devices are configured to coordinate for synchronous playback of audio content in accordance with their respective playback roles. At block 514, the control device 405 may then cause the selected playback devices to play back audio content in synchrony based on their respective playback roles. For instance, as one possibility, the control device 405 may transmit channel information to each selected playback device. As another possibility, the control device 405 may cause a group coordinator playback device of the home theater system to transmit playback timing and channel information to each other playback device of the home theater system. Other examples are also possible.

It should be understood that the discussion above with reference to FIGS. 5 and 6A-6D relates to one possible embodiment for enabling configuration of an audio subsystem (e.g. a home theater system) within a local media playback system (e.g., MPS 400). The control device 405 may enable configuration of the audio system in other ways as well. For example, in another implementation, the control device 405 may present one or more user interface views that guide the user through a sequence of component playback devices for a home theater configuration whereby the user can select playback devices for only those component playback devices which the user desires to add to the home theater system. In this respect, each interface view that may be presented for selecting a given playback device as a given component playback device may include an option to skip selection for the given component playback device if the user wishes not to include the given component playback device in the home theater configuration.

Other examples are also possible.

b. Battery-Powered PBDs as Temporary Home Theater Devices

After configuring the home theater system as described above, the control device 405 may continue to monitor the MPS 400 to detect any changes to the MPS 400 that may impact the configuration of the home theater system. For instance, the control device 405 may monitor the local network 401 or available Bluetooth connections to determine if any additional playback devices join the MPS or if any playback devices leave the MPS, or otherwise come within range of the MPS (e.g., within Bluetooth communication range of one or more other devices within the MPS). Based on detecting any such changes, the control device 405 may present an option to reconfigure the home theater system to include or exclude one or more playback devices in order to maintain and/or enhance the home theater listening experience. Advantageously, by monitoring both WIFI and Bluetooth networks, the control device 405 may be able to detect not only new devices that have joined the MPS 400 on a long-term basis, but also new devices that are eligible to join the MPS 400 on a short-term basis (e.g., temporarily). For instance, a second user that is not associated with the MPS 400 may bring a portable playback device (e.g., a battery-powered playback device) into the environment occupied by the MPS 400, and the portable playback device may be utilized to temporarily enhance the listening experience provided by the home theater system (e.g., by providing support for an additional audio channel).

Figure 7:
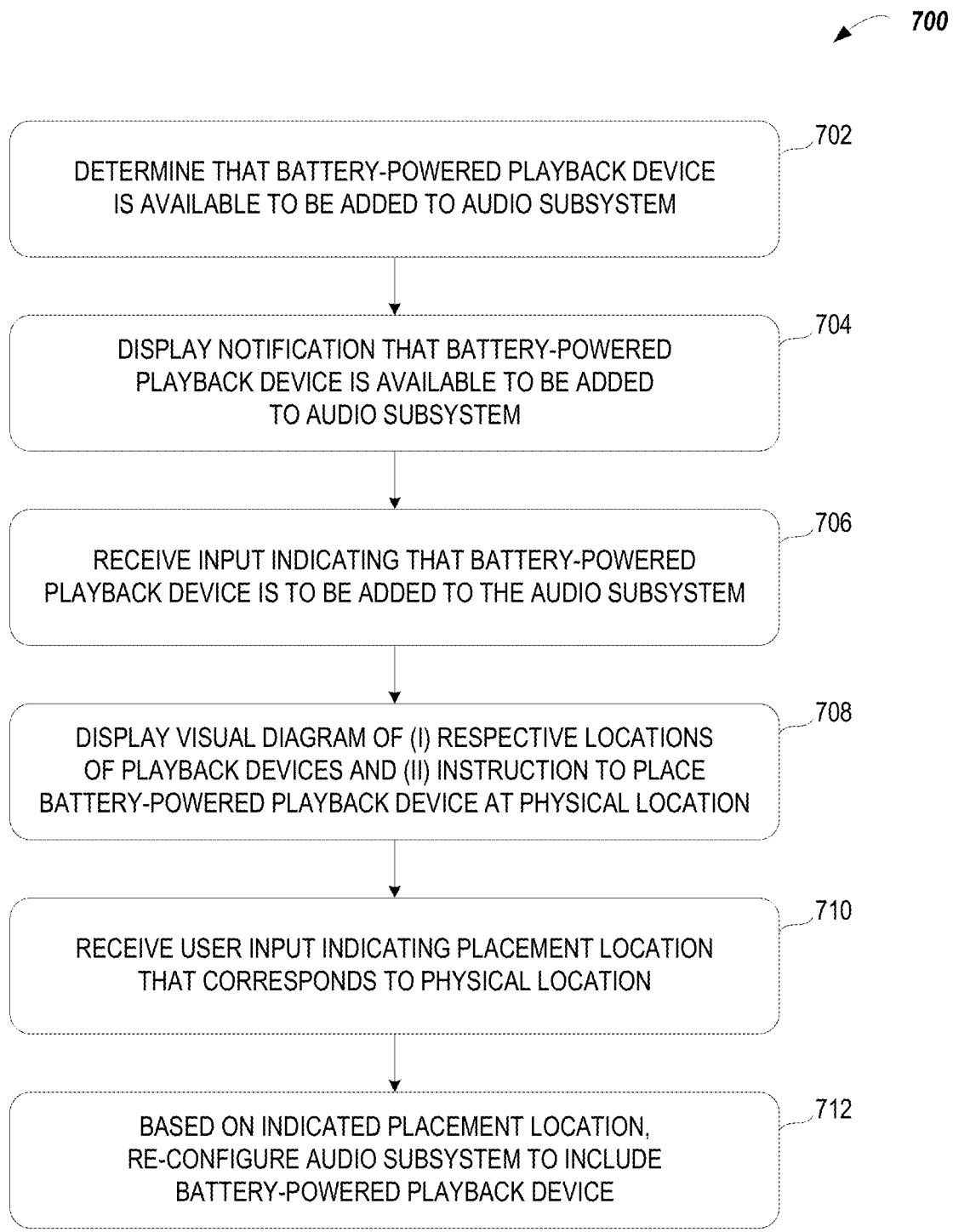
FIG. 7 depicts a flow diagram of one example process for reconfiguring an audio subsystem to temporarily include a battery-powered playback device in accordance with aspects of the disclosed technology.

FIG. 7 depicts one example process 700 for intelligently reconfiguring a home theater system to include a newly detected portable playback device. The example process 700 enables the portable playback device to be temporarily added to a home theater system of the MPS 400 and thereby enhance the home theater listening experience.

The example process 700 may begin at block 702, where the control device 405 may determine that a portable playback device is available to be added to an audio subsystem (e.g., a home theater system) of a local media playback system, such as the MPS 400. Determining that the portable playback device is available to be added to the home theater system may take various forms. As one example, the control device 405 may determine that the portable playback device is present within a threshold distance of the home theater system (e.g., within a threshold distance from a media display device or a group coordinator playback device of the home theater system, etc.). In general, this may involve detecting a transmission from the portable playback device advertising its availability (e.g., a Bluetooth Low Energy (BLE) beacon, an Ultra Wide Band (UWB) transmission, etc.).

Figure 8A:
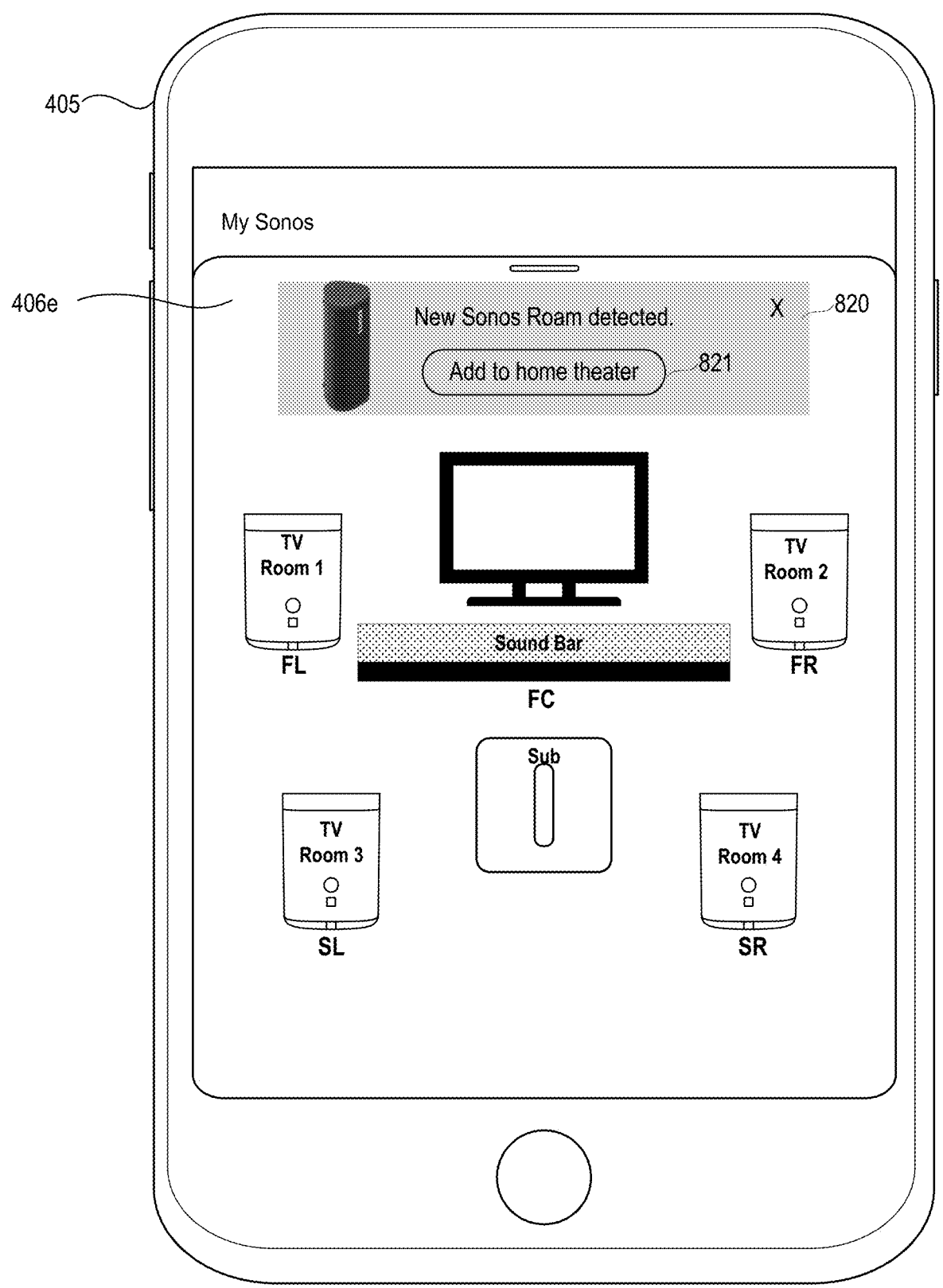
FIG. 8A depicts an example of an interface view that facilitates reconfiguring an audio subsystem to temporarily include a battery-powered playback device in accordance with aspects of the disclosed technology.

At block 704, the control device 405 may display a notification, via the user interface 406, that the portable playback device is available to be added to the home theater system. The notification may include a prompt requesting the user to indicate whether or not the portable playback device should be added to the home theater system. FIG. 8A depicts an example interface view 406e that may be presented upon detection of a portable playback device that is available to be added to the home theater system of FIGS. 6C and 6D that was configured in accordance with the example process 500 of FIG. 5 as discussed above. The example interface view 406e of FIG. 8A may include a notification 820 indicating that a given portable playback device has been detected and a selectable GUI element 821 for initiating a process to add the portable playback device to the home theater system.

At block 706, the control device 405 may receiving an input indicating that the portable playback device is to be added to the home theater system. For instance, the user may select the selectable GUI element 821 shown in FIG. 8A to add the portable playback device to the home theater system. In turn, at block 708, the control device 405 may display a visual diagram that includes (i) indications of respective locations of the existing playback devices of the home theater system and (ii) an instruction to place the portable playback device at a physical location within the environment occupied by the home theater system. The visual diagram may take various forms. As one example, the visual diagram may include respective visual representations of the playback devices in the home theater system that are arranged in a manner that reflects the respective physical locations of the playback devices within the environment occupied by the home theater system.

Figure 8B:
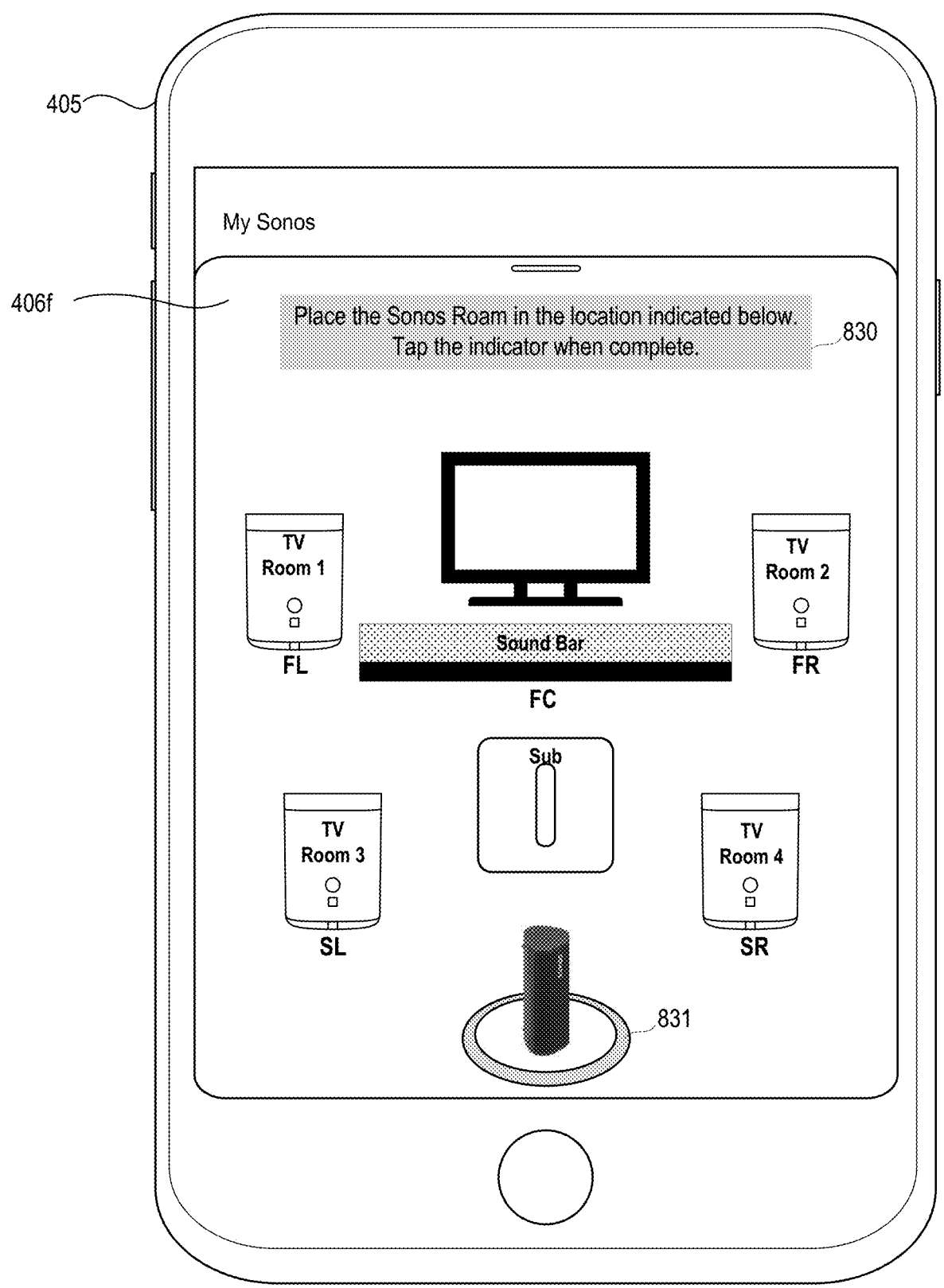
FIG. 8B depicts an example of another interface view that facilitates reconfiguring an audio subsystem to temporarily include a battery-powered playback device in accordance with aspects of the disclosed technology.

One possible implementation of such a visual diagram may be seen in FIG. 8B, which depicts an example interface view 406f that may be presented via the user interface of the control device 405 after receiving the input indicating that the portable playback device is to be added to the home theater system. For instance, the interface view 406f may be presented to the user after the selectable GUI element 821 of the interface view 406e shown in FIG. 8A is selected. As shown in FIG. 8B, the interface view 406f includes (i) a visual diagram of the home theater system that was previously configured (e.g., as discussed above with reference to FIGS. 6C, 6D), (ii) an instruction 830 to place the portable playback device at a physical location within the environment occupied by the home theater system, and (iii) an indicator 831 indicating a position of the physical location relative to the other playback devices of the home theater system. The physical location for placement of the portable playback device may be determined by the control device 405 based on evaluating the existing home theater system configuration and determining a location where placement of the portable playback device would be most valuable. For instance, in the example shown in FIG. 8B, the control device 405 indicates a position for the portable playback device at a rear location of the home theater configuration, such that the potable playback device may act as a single rear speaker and thereby convert the home theater system's existing true 5.1 configuration into a new true 6.1 configuration.

The instruction 830 may additionally instruct the user to provide an input indicating a placement location (e.g., an indication of a physical location where the portable playback device has been placed) for the portable playback device. As shown in FIG. 406f, the user is instructed to tap the indicator 831 after placing the portable playback device at the indicated physical location. Additionally or alternatively, although not shown in FIG. 8B, the interface view 406f may include an additional selectable GUI element (e.g., a "Done" button) to indicate that the portable playback device has been placed at the physical location.

Returning to FIG. 7, at block 710, the control device 405 may receive a user input indicating a placement location within the visual diagram that corresponds to a physical location within the environment occupied by the home theater system. For instance, continuing the example of FIG. 8B, the user input may comprise an input indicating a selection of the indicator 831 and/or an additional GUI element as described above. Alternatively, in other implementations, the instruction 830 may not indicate a particular physical location where the portable playback device is to be placed and may instead indicate a set of one or more physical locations options for placement of the portable playback device and may direct the user to select a given physical location where the portable playback device has been placed. For instance, in a situation where a pair of portable playback devices has been detected for temporary addition to an existing simulated 5.1 home theater configuration comprising three speakers and a subwoofer, the control device 405 may present options for placing the portable playback devices as either front speakers (e.g., converting the simulated 5.1 configuration into a true 5.1 configuration) or as rear speakers (e.g., converting the simulated 5.1 configuration into a simulated 7.1 configuration). Other configurations are also possible.

Alternatively still, the instruction 830 may not include any indication of a physical location where the portable playback device is to be placed and may instead direct the user to select a placement location within the visual diagram that corresponds to a physical location where the portable playback device has been placed. Other examples are also possible.

At block 712, based on the indicated placement location, the control device 405 may reconfigure the home theater subsystem to include the portable playback device. For instance, the control device 405 may cause the portable playback device to join the home theater system synchrony group such that the portable playback device is configured to coordinate (over the WIFI data network and/or a Bluetooth connection with one or more of the playback devices within the home theater system) for synchronous playback of audio content with the other playback devices of the home theater system. The control device 405 may additionally cause the portable playback device to play back audio content in synchrony based on a given playback role (e.g., the rear center role shown in FIG. 8B).

The process 700 for reconfiguring a home theater system may take other forms as well. For example, in another implementation, after receiving the input indicating that the portable playback device is to be added to the home theater system, the computing device may determine that the portable playback device has been placed at a physical location within the environment occupied by the home theater system. For instance, the control device 405 may detect (e.g., via proximity and/or location sensors, communication with the portable playback device and/or one or more other playback devices of the home theater system, etc.) that the portable playback device has been placed at a given physical location within the environment occupied by the home theater system. Based on the determined physical location, the control device 405 may reconfigure the home theater system to include the portable playback device as described above.

Although the examples regarding the temporary addition of portable playback device to a home theater configuration above have generally been presented as beginning with the detection of a newly available portable playback device, it will be appreciated that the process for reconfiguring a home theater system to temporarily include a portable playback device in a home theater system may be initiated manually from a setting accessible via the user interface 406 of the control device 405. For instance, the MPS 400 may include one or more portable playback devices that are not normally included in the home theater system because those portable playback device(s) are frequently moved to other locations inside or outside the user's home. Nonetheless, the user may wish to add their own portable playback devices to the home theater system when they experience particular types of digital media content (e.g., movies, sports events, etc.).

Further yet, in some other implementations, the control device 405 may detect that a portable playback device is available to be added temporarily to the home theater system but may determine a playback capability or a system configuration conflict that may adversely impact home theater system playback. For instance, the control device 405 may determine that a single portable playback device that is capable of supporting either right-channel or left-channel audio is available for temporary addition to the home theater system, but that addition of such a playback device would cause an imbalance in multi-channel audio playback by the home theater system, thereby diminishing the home theater listening experience. In such instances, the control device 405 may determine not to provide an indication that the portable playback device is available. As an alternative, the control device 405 may determine if the portable playback device could be added to the home theater system to supplement a particular playback role or fulfill a vacant playback role. For instance, if an existing home theater system does not have a subwoofer playback device, the control device 405 may determine that, while the portable playback device would not be an appropriate addition to the home theater system as a left or right-channel playback device on its own, it may be capable of produce low-frequency sound and may thus be a sufficient temporary substitute for a sub woofer.

Other examples are also possible.

Further, while the example process 700 is discussed above in the context of adding a portable playback device to an existing home theater system for a short-term period of time, it should be understood that one or more of the operations of the process 700 may be performed to add a portable playback device to an existing home theater system for a long-term period of time, and/or to add a stationary back device to an existing home theater system for a long-term or short-term period of time.

c. Spatial Audio Configuration

As mentioned above, home theater systems support multi-channel playback of audio content. Multi-channel playback may enhance a user's listening experience by causing the user to perceive a "wideness effect" during playback of audio content, sometimes also referred to as a "sound field." In some instances, the wideness effect that is produced by a home theater system might only be perceivable at limited locations within the environment of the home theater system. The locations at which a listener could perceive the wideness effect during playback may be increased by manipulating input signals provided to the home theater system. In situations where the home theater system is in a relatively smaller room or the user is closer in proximity to the home theater system, a less pronounced wideness effect may be beneficial. Alternatively, in situations where the home theater system is in a relatively larger room or the user is farther away from the home theater system, a more pronounced wideness effect may be beneficial.

The playback devices of a home theater system may comprise different groups of audio driver(s) that may be configured to generate sound waves according to different radiation patterns. Such radiation patterns may define a direction-dependent amplitude of sound waves produced by the corresponding group of audio drivers (i) at a given audio frequency (or range of audio frequencies), (ii) at a given radius from the audio driver, and/or (iii) for a given amplitude of input signal. A radiation pattern corresponding to a group of audio driver(s) may be dependent on the audio drivers' construction, structure, geometry, materials, and/or orientation and position within an enclosure of a playback device, for example.

In some implementations, the home theater system may provide a center channel of audio content to a first group, a second group, and if applicable, a third group of audio drivers. The first, second, and/or third groups may generate sound waves corresponding to the center channel according to a first radiation pattern having a maximum along a first direction (e.g., a center line of the home theater system). The home theater system may also provide a first side channel to the first group so that the first group may generate sound waves corresponding to the first side channel according to a second radiation pattern having a maximum along a second direction. The first radiation pattern and the second radiation pattern may combine via superposition to form a first response lobe that has a maximum along a third direction between the first and second directions. Since the first radiation pattern represents the center channel and the second radiation pattern represents the center channel and the first side channel, the first response lobe represents playback of both the center channel and the first side channel with a perceived wideness that is dependent on the relative input amplitudes of the center channel and the first side channel. That is, by increasing the amplitude of the center channel with respect to the first side channel, the maximum of the first response lobe is shifted toward the first direction, resulting in a "narrowed" multi-channel audio "image." Similarly, by decreasing the amplitude of the center channel with respect to the first side channel, the maximum of the first response lobe is shifted toward the second direction, resulting in a "widened" multi-channel audio "image."

In some implementations, the home theater system may provide the center channel and a second side channel to the third group, causing the third group to generate sound waves corresponding to both the center channel and the second side channel according to a third radiation pattern having a maximum along a fourth direction. The first radiation pattern and the third radiation pattern may combine to form a second response lobe that has a maximum along a fifth direction between the first and fourth directions. Since the first radiation pattern represents the center channel and the third radiation pattern represents the center channel and the second side channel, the second response lobe represents playback of both the center channel and the second side channel with a perceived wideness that is dependent on the relative input amplitudes of the center channel and the second side channel. That is, by increasing the amplitude of the center channel with respect to the second side channel, the maximum of the second response lobe is shifted toward the first direction, resulting in a "narrowed" multi-channel audio "image." Similarly, by decreasing the amplitude of the center channel with respect to the second side channel, the maximum of the second response lobe is shifted toward the fourth direction, resulting in a "widened" multi-channel audio "image."

Using the above techniques, the wideness of the multi-channel audio image may be adjusted in accordance with the environment of the home theater system. Additional information for automatic adjustment of multi-channel audio image wideness may be found in U.S. Pat. No. 9,736,610, issued Aug. 15, 2017, and titled "Manipulation of Playback Device Response Using Signal Processing," the contents of which are herein incorporated by reference in their entirety. One having ordinary skill in the art will appreciate that other techniques for manipulating sound field width are also possible.

Figure 9:
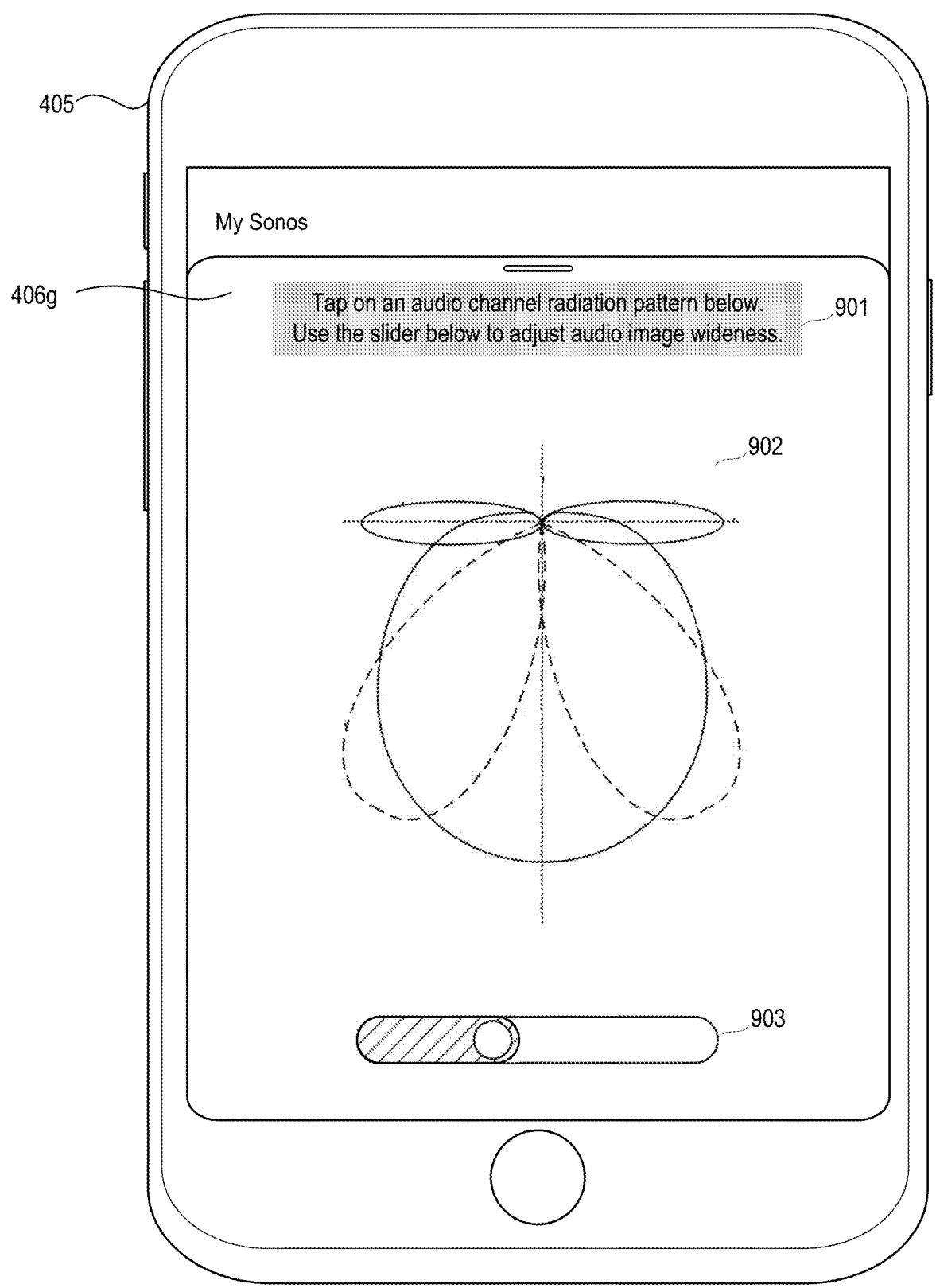
FIG. 9 depicts an example of another interface view that facilitates adjusting an audio image wideness in accordance with aspects of the disclosed technology Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

In line with the discussion above, and keeping in mind that many modern users prefer to be more actively involved with managing media playback systems and media playback system characteristics, also disclosed herein is software technology for facilitating user adjustment of a sound field (e.g., audio image wideness). At a high level, the disclosed software technology may comprise a user interface that depicts a visual representation of one or more audio radiation patterns that are produced by media playback systems, including home theater systems, and provides a software tool for adjusting the one or more audio radiation patterns. FIG. 9 depicts one example interface view 406g that includes a set of selectable visual representations 902 of audio radiation patterns produced by a home theater system, such as the home theater system of FIG. 6C, 6D, 8A, or 8B. The interface view 406g includes a slider tool 903 that may be used to increase or decrease the wideness of the radiation patterns depicted in the visual representations 902. Further, the interface view 406g includes a notification 901 that includes instructions for using the slider tool 903 to adjust the wideness of one or more radiation patterns.

The user interface for facilitating user adjustment of audio image wideness may take other forms as well. For example, the user interface may include a slider tool that enables adjustment of both wideness and height of an audio image (e.g., vertical and horizontal adjustment). In some implementations, different wideness and/or height settings can be associated with different types of audio content (e.g., a first wideness/height setting for audio content corresponding to video content being played back in the MPS, and a second wideness/height setting for only audio content, etc.).

In some implementations, audio image wideness can also be adjusted using spatial calibration. More information about spatial calibration can be found in U.S. Pat. No. 9,949,054, issued Apr. 17, 2018, and titled "Spatial Mapping of Audio Playback Devices in a Listening Environment," the contents of which are herein incorporated by reference in their entirety.

Other ways of adjusting audio image wideness are also possible.

In the ways described above, the disclosed software technology enables customization of home theater configurations and home theater characteristics in order to provide a more personalized listening experience.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising one or more IoT devices. An IoT device may be, for example, a device designed to perform one or more specific tasks (e.g., making coffee, reheating food, locking a door, providing power to another device, playing music, etc.) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator, etc.), a smart home fixture (e.g., a smart faucet, a smart showerhead, smart blinds, and a smart toilet, etc.), and a smart speaker (including any of the network accessible and/or voice-enabled playback devices described above). These IoT systems may also comprise one or more devices that communicate with the IoT device(s) via one or more networks such as one or more cloud servers (e.g., that communicate with the IoT device(s) over a WAN) and/or one or more computing devices (e.g., that communicate with the IoT device(s) over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:
a user interface;
at least one processor;
at least one non-transitory computer-readable medium; and
program instructions stored on the at least one non-transitory computer-readable medium that are executable by the at least one processor such that the computing device is configured to:
  display, via the user interface, a first set of one or more interface views that enable configuration of an audio subsystem within a local media playback system, wherein the user interface includes a set of one or more configuration options for the audio subsystem that have been determined based on available playback devices of the local media playback system;
  receive, via the user interface, a first input indicating a selection of a given configuration for the audio subsystem that comprises a given number of component playback devices, wherein each component playback device has a respective playback role;
  based on the given configuration and the available playback devices of the local media playback system, determine a set of one or more playback devices that are available for selection as the component playback devices of the given configuration for the audio subsystem;

display, via the user interface, a respective visual representation for each component playback device in the given configuration for the audio subsystem;
receive, via the user interface, a respective input selecting a given playback device of the one or more playback devices as one of the component playback devices of the given configuration for the audio subsystem;
configure the audio subsystem in accordance with the given configuration based on the selected playback devices; and
cause the playback devices in the audio subsystem to play back audio content in synchrony based on their respective playback roles.

2. The computing device of claim 1, further comprising program instructions stored on the at least one non-transitory computer-readable medium that are executable by the at least one processor such that the computing device is configured to:
after displaying the respective visual representation for each component playback device in the given configuration for the audio subsystem:
receive a first input indicating a selection of a first component playback device of the given configuration;
based on the first input, update the user interface to display a subset of the one or more playback devices that are available to be selected as the first component playback device of the given configuration; and
receive a second input indicating a selection of a second component playback device of the given configuration.

3. The computing device of claim 1, further comprising program instructions stored on the at least one non-transitory computer-readable medium that are executable by the at least one processor such that the computing device is configured to:
display a respective visual indicator for each playback device that has been selected for inclusion in the audio subsystem.

4. The computing device of claim 1, further comprising program instructions stored on the at least one non-transitory computer-readable medium that are executable by the at least one processor such that the computing device is configured to:
determine that a battery-powered playback device is available to be added to the audio subsystem;
display, via the user interface, a notification that the battery-powered playback device is available to be added to the audio subsystem; and
receive, via the user interface, an input indicating that the battery-powered playback device is to be added to the audio subsystem.

5. The computing device of claim 4, further comprising program instructions stored on the at least one non-transitory computer-readable medium that are executable by the at least one processor such that the computing device is configured to:
display, via the user interface, a visual diagram including (i) respective locations of the playback devices of the audio subsystem and (ii) an instruction to place the battery-powered playback device at a physical location within an environment occupied by the audio subsystem;
receive, via the user interface, a user input indicating a placement location within the visual diagram that corresponds to the physical location within the environment occupied by the audio subsystem; and
based on the indicated placement location, re-configure the audio subsystem to include the battery-powered playback device.

6. The computing device of claim 4, further comprising program instructions stored on the at least one non-transitory computer-readable medium that are executable by the at least one processor such that the computing device is configured to:
determine that the battery-powered playback device has been placed at a physical location within an environment occupied by the audio subsystem; and
based on the physical location, re-configure the audio subsystem to include the battery-powered playback device.

7. The computing device of claim 6, further comprising program instructions stored on the at least one non-transitory computer-readable medium that are executable by the at least one processor such that the computing device is configured to:
before determining that the battery-powered playback device has been placed at the physical location within the environment occupied by the audio subsystem:
display, via the user interface, a visual diagram including (i) respective locations of the playback devices of the audio subsystem and (ii) an instruction to place the battery-powered playback device at the physical location, wherein the instruction comprises a visual indication of a placement location within the visual diagram that corresponds to the physical location within the environment occupied by the audio subsystem.

8. The computing device of claim 4, wherein the program instructions that are executable by the at least one processor such that the computing device is configured to determine that the battery-powered playback device is available to be added the audio subsystem comprise program instructions that are executable by the at least one processor such that the computing device is configured to:
receive an indication from a given playback device of the audio subsystem that the battery-powered playback device is available to be added the audio subsystem.

9. The computing device of claim 1, further comprising program instructions stored on the at least one non-transitory computer-readable medium that are executable by the at least one processor such that the computing device is configured to:
display, via the user interface, a second set of one or more interface views that enable configuration of spatial audio for the audio subsystem; and
receive, via the user interface, input defining at least one spatial audio setting for the audio subsystem.

10. The computing device of claim 9, wherein:
the second set of one or more interface views include instructions for performing a spatial calibration for the audio subsystem using one or more microphone devices of the computing device; and
the computing device further comprises program instructions stored on the at least one non-transitory computer-readable medium that are executable by the at least one processor such that the computing device is configured to:
configure the spatial audio for the audio subsystem based at least in part on input detected by the one or more microphone devices of the computing device.

11. The computing device of claim 9, wherein:
the spatial audio setting comprises an audio image setting;
the second set of one or more interface views include an interface tool for adjusting an audio image wideness; and
the computing device further comprises program instructions stored on the at least one non-transitory computer-readable medium that are executable by the at least one processor such that the computing device is configured to:
configure the spatial audio for the audio subsystem based at least in part on one or more inputs received via the interface tool.

12. At least one non-transitory computer-readable medium, wherein the at least one non-transitory computer-readable medium is provisioned with program instructions that, when executed by at least one processor, cause a computing device to:
display, via a user interface, a first set of one or more interface views that enable configuration of an audio subsystem within a local media playback system, wherein the user interface includes a set of one or more configuration options for the audio subsystem that have been determined based on available playback devices of the local media playback system;
receive, via the user interface, a first input indicating a selection of a given configuration for the audio subsystem that comprises a given number of component playback devices, wherein each component playback device has a respective playback role;
based on the given configuration and the available playback devices of the local media playback system, determine a set of one or more playback devices that are available for selection as the component playback devices of the given configuration for the audio subsystem;
display, via the user interface, a respective visual representation for each component playback device in the given configuration for the audio subsystem;
receive, via the user interface, a respective input selecting a given playback device of the one or more playback devices as one of the component playback devices of the given configuration for the audio subsystem;
configure the audio subsystem in accordance with the given configuration based on the selected playback devices; and
cause the playback devices in the audio subsystem to play back audio content in synchrony based on their respective playback roles.

13. The at least one non-transitory computer-readable medium of claim 12, wherein the at least one non-transitory computer-readable medium is also provisioned with program instructions that, when executed by the at least one processor, cause the computing device to:
after displaying the respective visual representation for each component playback device in the given configuration for the audio subsystem:
receive a first input indicating a selection of a first component playback device of the given configuration;
based on the first input, update the user interface to display a subset of the one or more playback devices that are available to be selected as the first component playback device of the given configuration; and
receive a second input indicating a selection of a given playback device from the subset as the first component playback device of the given configuration.

14. The at least one non-transitory computer-readable medium of claim 12, wherein the at least one non-transitory computer-readable medium is also provisioned with program instructions that, when executed by the at least one processor, cause the computing device to:
display a respective visual indicator for each playback device that has been selected for inclusion in the audio subsystem.

15. The at least one non-transitory computer-readable medium of claim 12, wherein the at least one non-transitory computer-readable medium is also provisioned with program instructions that, when executed by the at least one processor, cause the computing device to:
determine that a battery-powered playback device is available to be added to the audio subsystem;
display, via the user interface, a notification that the battery-powered playback device is available to be added to the audio subsystem; and
receive, via the user interface, an input indicating that the battery-powered playback device is to be added to the audio subsystem.

16. The at least one non-transitory computer-readable medium of claim 15, wherein the at least one non-transitory computer-readable medium is also provisioned with program instructions that, when executed by the at least one processor, cause the computing device to:
display, via the user interface, a visual diagram indicating (i) respective locations of the playback devices of the audio subsystem and (ii) an instruction to place the battery-powered playback device at a physical location within an environment occupied by the audio subsystem;
receive, via the user interface, a user input indicating a placement location within the visual diagram that corresponds to the physical location within the environment occupied by the audio subsystem; and
based on the indicated placement location, re-configure the audio subsystem to include the battery-powered playback device.

17. The at least one non-transitory computer-readable medium of claim 15, wherein the at least one non-transitory computer-readable medium is also provisioned with program instructions that, when executed by the at least one processor, cause the computing device to:
determine that the battery-powered playback device has been placed at a physical location within an environment occupied by the audio subsystem; and
based on the determined physical location, re-configure the audio subsystem to include the battery-powered playback device.

18. A method carried out by a computing device, the method comprising:
displaying, via a user interface, a first set of one or more interface views that enable configuration of an audio subsystem within a local media playback system, wherein the user interface includes a set of one or more configuration options for the audio subsystem that have been determined based on available playback devices of the local media playback system;
receiving, via the user interface, a first input indicating a selection of a given configuration for the audio subsystem that comprises a given number of component playback devices, wherein each component playback device has a respective playback role;
based on the given configuration and the available playback devices of the local media playback system, determining a set of one or more playback devices that are available for selection as the component playback devices of the given configuration for the audio subsystem;

displaying, via the user interface, a respective visual representation for each component playback device in the given configuration for the audio subsystem;

receiving, via the user interface, a respective input selecting a given playback device of the one or more playback devices as one of the component playback devices of the given configuration for the audio subsystem;

configuring the audio subsystem in accordance with the given configuration based on the selected playback devices; and causing the playback devices in the audio subsystem to play back audio content in synchrony based on their respective playback roles.

19. The method of claim 18, further comprising:

after displaying the respective visual representation for each component playback device in the given configuration for the audio subsystem:

receiving a first input indicating a selection of a first component playback device of the given configuration;

based on the first input, updating the user interface to display a subset of the one or more playback devices that are available to be selected as the first component playback device of the given configuration; and receiving a second input indicating a selection of a given playback device from the subset as the first component playback device of the given configuration.

20. The method of claim 18, further comprising:

determining that a battery-powered playback device is available to be added to the audio subsystem;

displaying, via the user interface, a notification that the battery-powered playback device is available to be added to the audio subsystem; and receiving, via the user interface, an input indicating that the battery-powered playback device is to be added to the audio subsystem.

* * * * *